(12) United States Patent
Nakajima et al.

(10) Patent No.: US 6,348,847 B1
(45) Date of Patent: Feb. 19, 2002

(54) CONTROL DEVICE FOR BREAKER

(75) Inventors: Nobuya Nakajima; Kyouichi Ohtsuka, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/827,168

(22) Filed: Apr. 6, 2001

(30) Foreign Application Priority Data

Nov. 20, 2000 (JP) ............................................ 12-352028

(51) Int. Cl.[7] ................................................. H01H 3/00
(52) U.S. Cl. .............................. 335/195; 335/6; 335/21; 335/22; 335/167; 335/171; 335/185; 335/194; 200/17 R
(58) Field of Search ................................ 335/6, 21, 22, 335/25, 167–171, 185, 189–192, 194, 195; 200/17 R–17 B, 400

(56) References Cited

U.S. PATENT DOCUMENTS 4,839,476 A 6/1989 Okuno ........................ 200/17

Primary Examiner—Ramon M. Barrera
(74) Attorney, Agent, or Firm—Sughrue Mion, PLLC

(57) ABSTRACT

A making operation preventing device 130 has a releasing trigger 19 for retaining, via a releasing latch 18, a breaking lever 36 to which a torque in a counterclockwise direction is applied by an opening torsion bar 34; a releasing electromagnet 20 for opening an on-off contact 10 by releasing the engagement between the releasing trigger 19 and the releasing latch 18 to rotate the breaking lever 36 in a counterclockwise direction; a cam 3 rotated as one body with a gear 40 connected via a link 41 to a making lever 37 to which a torque in a counterclockwise direction is applied by a closing torsion bar 35; a making trigger 15 which retains a second pin 13 attached to the cam 3 via a making latch 14 and maintains the closing torsion bar 35 in a prestressing state; a releasing electromagnet 16 for driving a trigger lever 16d in a right direction to release the engagement between the making latch 14 and the making trigger 15, and an interlocking electromagnet for rotating the trigger lever 16d in a counterclockwise direction when a circuit opening instruction is generated to thereby prevent a circuit closing operation.

11 Claims, 26 Drawing Sheets

CONTROL DEVICE FOR BREAKER

BACKGROUND OF THE INVENTION

Field of the Invention

The present invention relates to a control device for a breaker.

Discussion of Background

In operating a breaker as a make break switch, a control device utilizing a spring force has been practiced.

FIGS. 25 to 31 show a conventional control device for a breaker disclosed in, for instance, JP-A-63-304542. FIG. 25 is a perspective view showing the A construction of such control device for a breaker. FIG. 26 is a diagram showing an important portion of the control device of the breaker, wherein the breaker is in a state of closing the circuit, and both opening and closing torsion bars are prestressed.

FIG. 27 is a diagram showing a making electromagnet and elements related to the making electromagnet. FIG. 28 is a diagram showing the important portion of the control device of the breaker in a opening state, wherein the opening torsion bars are released and the closing torsion bars are prestressed. FIG. 29 is a diagram showing the important portion of the control device of the breaker in a closing state, wherein the opening torsion bars are prestressed and the closing torsion bars are released. FIG. 30 is a sequential diagram of a control circuit in the breaker, and FIG. 31 is a diagram showing an operation chart of an auxiliary switch.

In these figures, numerical reference 1 designates a casing, numerical reference 24 designates a cylinder fixed to the casing 1, and numerical references 26 and 27 designate levers fitted to pins (not shown) provided at an end face of the cylinder 24 so as to be capable of rotating. Numerical references 28 and 34 designate opening torsion bars, and numerical references 29 and 35 designate closing torsion bars. In order to prestress the opening torsion bars 28 and 34 by releasing the A closing torsion bars 29 and 35, energy stored by the closing torsion bars 29, 35 is made larger than energy stored by the opening torsion bars 28, 34. The opening torsion bar 28 has an end fixed to the casing 1 and the other end fixed to the lever 26. The opening torsion bar 34 has an end fixed to a rotating shaft 32 and the other end fixed to the lever 26.

The closing torsion bar 29 has an end fixed to the casing 1 and the ether end fixed to the lever 27. The closing torsion bar 35 has an end fixed to a rotating shaft 33 and the other end fixed to the lever 27. Numerical reference 37 designates a making lever fixed to the rotating shaft 33, which is so constructed that a rotating force in a counterclockwise direction in FIG. 26 is given by the closing torsion bars 29, 35. In this text, indications concerning a rotational direction, left and right directions and upper and lower directions are based on the surface of papers on which the figures are drawn unless specifically mentioned. Numerical reference 2 designates a camshaft supported by the casing 1; numerical reference 3 a cam attached to the cam shaft 2; numerical reference 13 a second pin formed in the cam 3, and numerical reference 14 a making latch engaged with the second pin 13. Numerical reference 15 designates a making trigger engaged with the making latch 14, which is provided with a head portion 15a and a corner edge portion 15b.

Numerical reference 16 designates a making electromagnet which has a making coil 16a and a plunger 16b as shown in detail in FIG. 27. The plunger 16b comprises a body portion 16c and a trigger lever 16d connected rotatably to the body portion 16c by means of a pin 16f. The trigger lever 16d has a stepped portion 16e so as to be capable of engaging with the making trigger 15. Numerical reference 17 designates a spring to urge the trigger lever 16d in a clockwise direction so that the trigger lever 16d is held in a horizontal state in contact with a stopper (not shown) formed in the body portion 16c.

Numerical reference 21 designates a leaf spring attached to the casing 1 so as to oppose to the trigger lever 16d wherein an upper portion of the leaf spring is free with respect to the casing, and it is deformable elastically in left and right directions in FIG. 27. The plunger 16b is driven in a right direction in FIG. 27 when the making coil 16a is excited. When excitation to the making coil 16a is stopped, it is returned to the original position by the action of a return spring (not shown).

In FIG. 26, numerical reference 38 designates a Us rotating shaft supported by the casing 1 and is driven by a motor (not shown) in a counterclockwise direction. Numerical reference 39 designates a pinion fixed to the rotating shaft 38 and numerical reference 40 designates a gear which is fixed to the camshaft 2 to mesh with the pinion 39 and in which a part of the teeth is removed so that it disengages from the pinion 39 when the closing torsion bars 29, 35 are prestressed. Numerical reference 41 designates a link connecting a making lever 37 with the gear 40.

Numerical reference 36 designates a breaking lever fixed to the rotating shaft 32 and is so constructed as to receive a rotating force in a counterclockwise direction by the opening torsion bars 28, 34. Numerical references 8 and 9 designate respectively a first pin and a rotor attached to the breaking lever 36. Numerical reference 18 designates a releasing latch which is engaged with the first pin 8 and receives a rotating force in a clockwise direction by a spring 43.

Numerical reference 19 designates a releasing trigger engaged with the releasing latch 18 and numerical reference 20 designates a releasing electromagnet having a releasing coil 20a and a plunger 20b. The plunger 20b is driven in a right direction in FIG. 26 by the excitation to the releasing coil 20a. When excitation to the releasing coil 20a is stopped, the plunger 20b is returned to the original position by the action of a return spring (not shown). Numerical reference 10 designates an on-off contact of the breaker, numerical reference 12 a stationary contact and numerical reference 22 a movable contact. The movable contact 22 is connected to the breaking lever 36 via a linkage mechanism 23. Numerical reference 42 designates a buffer connected to the breaking lever 36 to relax an impact applied at the time of on-off operations of the movable contact 22.

In the next, the operation of opening the circuit will be described. In FIG. 26, the breaking lever 36 is constantly applied with a rotating force in a counterclockwise direction by the opening torsion bars 28, 34, and the rotating force is retained by the releasing latch 18 and the releasing trigger 19. When the releasing electromagnet 20 is excited in this state, the plunger 20b is moved in a right direction and the releasing trigger 19 is rotated in a clockwise direction whereby the releasing latch 18 is rotated in a counterclockwise direction by a counter force applied from the first pin 8. When the releasing latch 18 is disengaged from the first pin 8, the breaking lever 36 is rotated in a counterclockwise direction, and the movable contact 22 is driven in a direction of opening the circuit. FIG. 28 shows a state that the operation of opening the circuit is completed.

An operation of closing the circuit is conducted as follows. In FIG. 28, the cam 3 is connected to the making lever 37 via the camshaft 2, the gear 40 and the link 41, wherein a rotating force in a clockwise direction is applied by the closing torsion bars 29, 35. The rotating force is retained by the making latch 14 and the making trigger 15.

When the making electromagnet 16 is excited in this state, the body portion 16c of the plunger 16b and the trigger lever 16d connected thereto are moved in a right direction, and the making trigger 15 is rotated in a clockwise direction by a kicking motion thereof, whereby the making latch 14 is rotated in a counterclockwise direction by a counter force from the second pin 13. When the making latch 14 is disengaged from the second pin 13, the cam 3 is rotated in a clockwise direction, and the rotor 9 mounted on the breaking lever 36 is pushed up, whereby the breaking lever 36 is driven by twisting the opening torsion bars 28, 34 in a clockwise direction.

Further, the making latch 14 is disengaged from the making trigger 15 to rotate in a counterclockwise direction, and the making trigger 15 is further rotated in a clockwise direction by a pushing force of the making latch 14. At this moment, since the corner edge portion 15b of the making trigger 15(FIG. 27) pushes up the trigger lever 16d, and the trigger lever 15 is urged in a right direction by the excitation to the coil 16a, the trigger lever 16d rides on the leaf spring 21. Since the trigger lever rides on the leaf spring 21 in the completion of closing the circuit, the making trigger 15 is returned to a self-standing position without any interference by the trigger lever 16d, whereby the engagement of the making latch 14 with the making trigger becomes possible, and the closing torsion bars 29, 35 are ready for a prestressed state.

When the excitation to the making electromagnet 16 is stopped, the plunger 16d is moved for returning in a left direction by a return spring (not shown). By the returning in the left direction of the plunger 16d, the trigger lever 16d is disengaged from the leaf spring 21 and is pushed by the spring 17 to become a horizontal state. Thus, the control device is returned to the state as shown in FIG. 28.

The closing torsion bars 29, 35, after having been released, are immediately prestressed by the motor via the pinion 39 and the gear 40, and the second pin 13 is retained by the making trigger 15, which is returned to the self-standing position, by means of the making latch 14, whereby the closing torsion bars are kept to a prestressed state.

As describe above, the closing torsion bars 29, 35 can be kept in a prestressed state even though the making electromagnet 20 is in excitation, and the circuit closing operation by the on-off contact 10 is prevented even when the closing torsion bars 29, 35 are released again. Namely, the rotation of the making trigger 15 by the trigger lever 16d can not be effected unless the excitation to the making electromagnet 16 is stopped, so that the on-off contact 10 can not close the circuit. Thus, the pumping is mechanically suppressed.

When the breaking lever 36 is rotated by a predetermined angle and the movable contact 22 is driven in the direction of closing the circuit, the releasing latch 18 is engaged with the first pin 8, and the releasing trigger 19 is engaged with the releasing latch 18. The cam 3 is continuously rotated to hold the breaking lever 36 via the rotor 9 until the engagement between the releasing latch 18 and the first pin 8 and between the releasing trigger 19 and the releasing latch 18 are stabilized. Thereafter, the cam 3 is disconnected from the rotor 9. FIG. 29 shows a state that the operation of closing the circuit is completed, and the first pin 8 is retained by the releasing latch 18.

The operation of prestressing the closing torsion bars 29, 35 is as follows. As shown in FIG. 29, immediately after the completion of closing the circuit, the closing torsion bars 29, 35 are in a releasing state. By rotating the pinion 39 in the counterclockwise direction by the motor (not shown), the gear 40 is rotated in the clockwise direction, and the closing torsion bars 29, 35 are prestressed via the link 41, the making lever 37 and the rotating shaft 33.

At the position of dead point where a direction of pulling the link 41 crosses the center of the camshaft 2, the camshaft 2 is applied with a rotating force in a clockwise direction through the link 41 by the force of the closing torsion bars 29, 35. At the same time, the engagement between the pinion 39 and the gear 40 is released because the teeth of the gear 40 are partly removed. The making latch 14 is engaged with the second pin 13, and the rotating force of the gear 40 in the clockwise direction caused by the force of the closing torsion bars 29, 35 is retained, whereby the prestressing operation is completed. Thereafter, the control device is returned to the state as shown in FIG. 26.

Next, the operational sequence of the breaker is explained with reference to FIG. 30. In FIG. 30, numerical reference 52C represents a making coil 16a of the making electromagnet 16 and numerical reference 52T represents a releasing coil 20a of the releasing electromagnet 20. Numerical references 52a, 52b designate respectively a normally open contact and a normally close contact of an auxiliary switch (not shown) of the breaker. Numerical reference 881a designates a normally open contact of a circuit closing auxiliary relay (not shown) for generating a circuit closing instruction and numerical reference 882a designates a normally open contact of a circuit opening auxiliary relay (not shown) for generating a circuit opening instruction.

The making coil 52C has a terminal at one side which is connected to a negative terminal N of a D.C. power source and the other terminal at the other side which is connected to a positive terminal P of the D.C. power source through the normally close contact 52b, the making terminal C and the normally open contact 881a. The releasing coil 52T has a terminal at one side which is connected to the negative terminal N of the D.C. power source and the other terminal at the other side which is connected to the positive terminal P of the D.C. power source through the normally open contact 52a, the releasing terminal T and the normally open contact 882a.

The auxiliary switch of the breaker is mechanically connected to the breaking lever 36 to open and close the normally open contact 52a and the normally close contact 52b in connection with the opening/closing of the on-off contact 10 for opening and closing the main circuit of the breaker. Further, the auxiliary switch is so adapted that in an operation of closing the circuit of the breaker, the normally close contact 52b is opened at a point P1 at a time point t1 in a change of the stroke of the movable contact 12, and the normally open contact 52a is closed at a point P2 at a time point t2, whereby the releasing coil 52T can be excited, as shown in the operational chart of FIG. 31.

Further, in an operation of opening, the normally open contact 52a is opened at a point P3 at a time point t3 in the course of opening the circuit, whereby the excitation to the releasing coil 52T is stopped. Further, at a point P4 at a time point t4, the normally close contact 52b is closed, and the excitation to the making coil 52C becomes possible.

Since a circuit opening instruction is generated continuously in the above-mentioned conventional control device for breakers, the normally close contact 52b is closed at the point P4, in FIG. 31, in the course of opening the circuit even when the normally open contact 882a is closed in FIG. 30, and accordingly, the excitation to the making coil 52C (16a) becomes possible. In such state, when the normally open contact 881a (FIG. 30) is closed by a circuit closing instruction, the making coil 52C is excited thereby conducting a circuit closing operation. Further, a circuit closing operation is made even by exciting the making coil 52C manually.

Although electrically interlocking means are provided in a control circuit for breakers so as not to generate a circuit closing instruction while a circuit opening instruction is generated, there is still a possibility to cause a circuit closing operation while the circuit opening instruction is generated. Therefore, there is a demand of eliminating certainly such disadvantage so that reliability on keeping a circuit opening state can be increased.

SUMMARY OF THE INVENTION

It is an object of the present invention to provide a control device for a breaker, which prevents an undesired circuit closing operation and improves the reliability on keeping a circuit opening state.

According to an aspect of the present invention, there is provided a control device for a make break switch which comprises a prestressing means for opening circuit, connected to an on-off contact; a retaining means for opening circuit, which retains a prestressing force of the prestressing means for opening circuit and which according to a circuit opening instruction, releases the prestressing force of the prestressing means for opening circuit to open the on-off contact by a releasing force of the prestressing means for opening circuit; a retaining means for closing circuit, which retains a prestressing force of a prestressing means for closing circuit and which according to a circuit closing instruction, release the prestressing force of the prestressing means for closing circuit to close the onoff contact by a releasing force of the prestressing means for closing circuit via the prestressing means for opening circuit; and a making operation preventing device actuated by an circuit opening instruction to prevent the releasing of the prestressing force of the prestressing means for closing circuit, which is caused by the retaining means for closing circuit.

Since the making operation preventing device is so adapted as to receive a circuit opening instruction to thereby prevent the releasing of the prestressing force of the prestressing means for closing circuit, which is caused by the retaining means for closing circuit, a needless circuit closing operation can be prevented when the circuit opening instruction is generated.

Further, the retaining means for closing circuit comprises a circuit closing electromagnet having a plunger which is driven by an exciting coil and a releasing member driven by the plunger to release the prestressing force of the prestressing means for closing circuit, and the making operation preventing device is provided to prevent the releasing member from being driven by the plunger.

Since the releasing member can not be driven by the plunger, a needless circuit closing operation can be prevented when a circuit opening instruction is generated.

Further, in the retaining means for closing circuit, the plunger has a body portion and a rotatable member connected to the body portion so as to be capable of being bent by rotating itself in a direction perpendicular to the direction of moving the body portion, said retaining means for closing circuit being adapted to release the prestressing force of the prestressing means for closing circuit by driving the releasing means via the rotatable member, and the making operation preventing device has an interlocking electromagnet comprising an electromagnet and a movable member driven by the electromagnet, the making operation preventing device being so adapted that when the electromagnet is excited by a circuit opening instruction, the rotatable member is bent by the movable member to make the engagement with the releasing member impossible whereby the driving of the releasing member by the rotatable member can be prevented.

Thus, the rotatable member is bent to render the engagement of the rotatable member with the releasing member to be incapable to thereby prevent the rotatable member from driving the releasing member, whereby a needless circuit closing operation can be prevented when a circuit opening instruction is generated.

Further, the making operation preventing device prevents the plunger from moving.

Since the movement of the plunger is prevented to prevent the driving of the releasing member, a needless circuit closing operation can be prevented when a circuit opening instruction is generated.

Further, the making operation preventing device has an interlocking electromagnet comprising an electromagnet and a movable member driven by the electromagnet so that when the electromagnet is excited by a circuit opening instruction, the movement of the plunger is mechanically prevented by the movable member.

Since the movement of the plunger can mechanically be prevented by the movable member, the driving of the releasing member can be prevented. Accordingly, a needless circuit opening operation can be prevented when a circuit opening instruction is generated.

Further, the making operation preventing device has an interlocking coil which is excited by a circuit opening instruction to cancel an electromagnetic force of the circuit closing electromagnet whereby the movement of the plunger is prevented.

The movement of the plunger is prevented by canceling the electromagnet force of the circuit closing electromagnet, whereby a needless circuit closing operation can be prevented when a circuit opening instruction is generated.

Further, the making operation preventing device has an interlocking electromagnet comprising an electromagnet and a movable member driven by the electromagnet so that the electromagnet is excited by a circuit opening instruction and the movable member holds the releasing member so as not to move.

Since the releasing member is restricted so as not to being driven by the movable member, a needless circuit opening operation can be prevented when a circuit opening instruction is generated.

Further, an excitation breaking means is provided to stop excitation to the interlocking electromagnet or the interlocking coil when the circuit opening instruction is continued for a predetermined time.

Since the excitation to the interlocking electromagnet or the interlocking coil is stopped after the circuit opening instruction is continued for a predetermined time, the interlocking electromagnet or the interlocking coil can be of a type of short time.

BRIEF DESCRIPTION OF THE DRAWINGS

A more complete appreciation of the invention and many of the attendant advantages thereof will be readily obtained as the same becomes better understood by reference to the following detailed description when considered in connection with the accompanied drawings, wherein.

DETAILED DESCRIPTION OF THE PREFERRED EMBODIMENTS

EMBODIMENT 1

Figure 1:
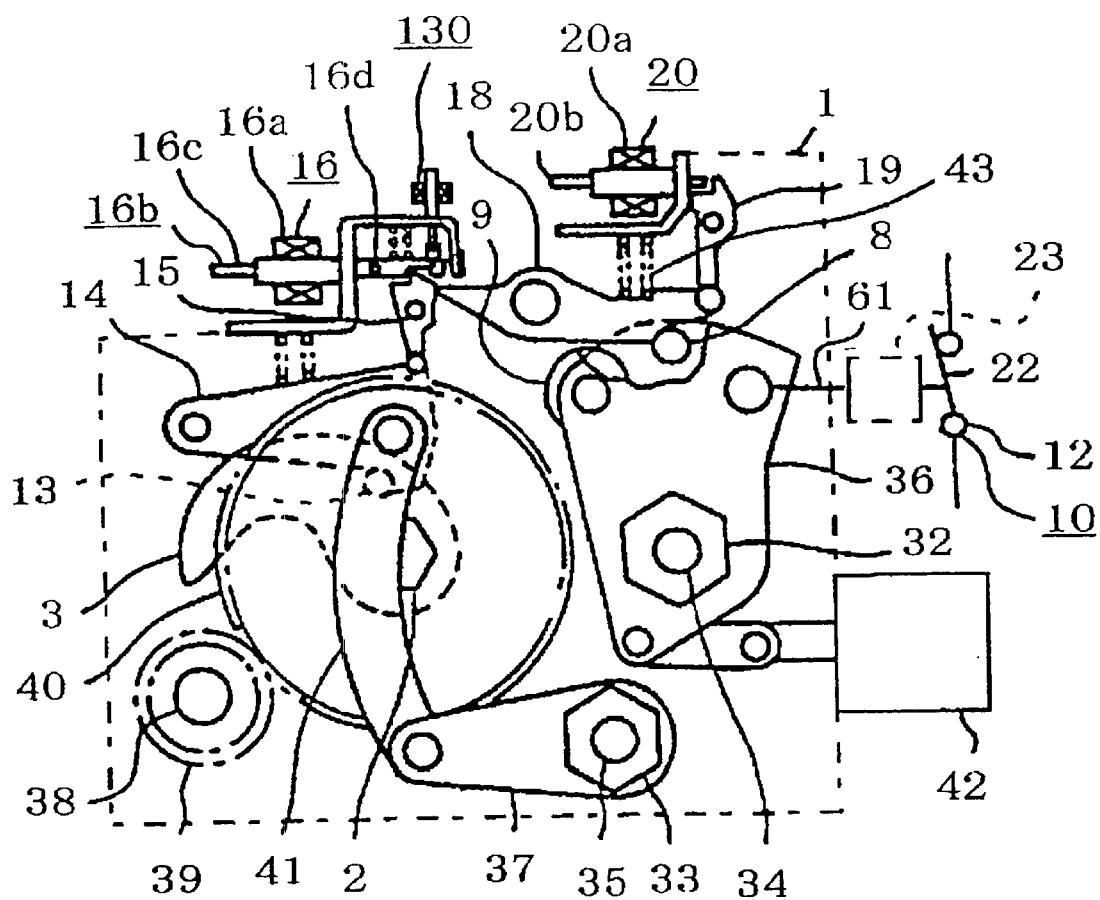
FIG. 1 is a diagram showing an important portion of the control device for a breaker according to an embodiment of the present invention wherein the breaker is in a state of closing the circuit, and closing and opening torsion bars are prestressed.
Figure 2:
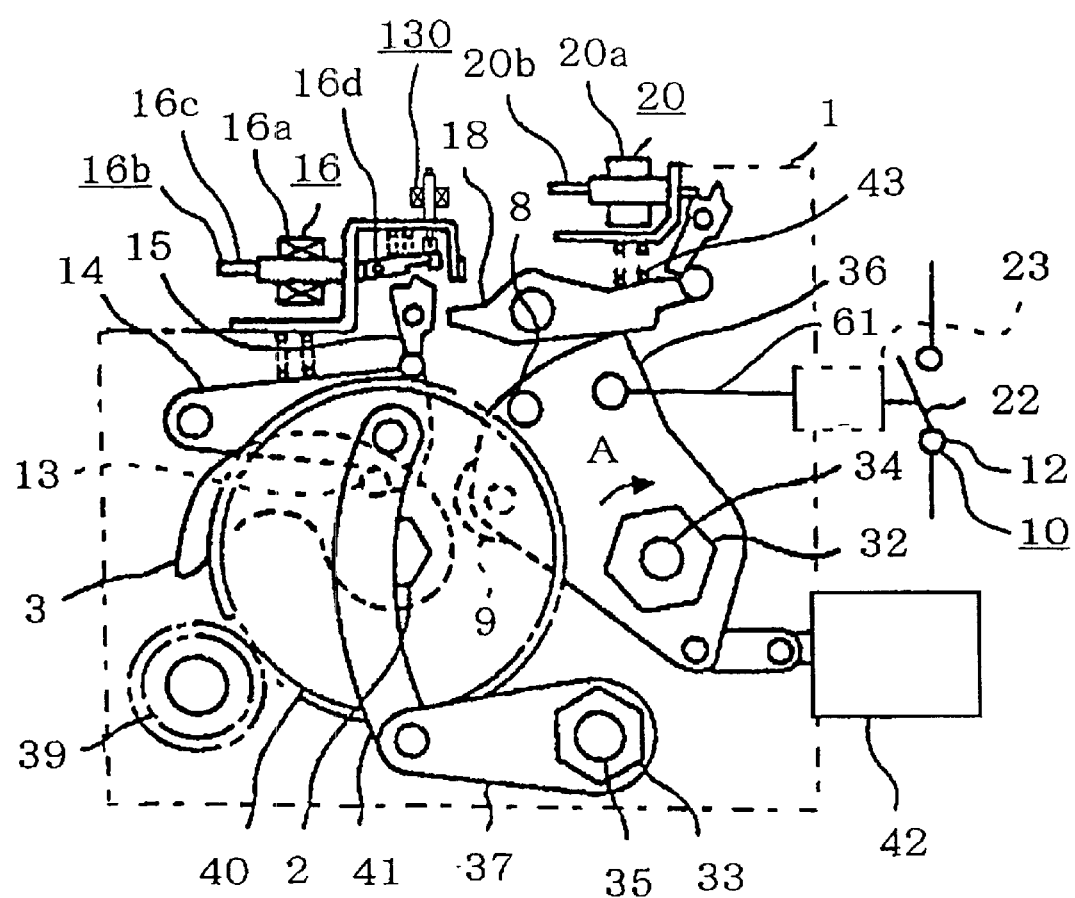
FIG. 2 shows the control device for a breaker in FIG. 1 in a state that the breaker is in a circuit opening state; the closing torsion bars are prestressed, and the opening torsion bars are released.

FIGS. 1 to 5 show an embodiment of the control device for a breaker according to the present invention. FIG. 1 is a diagram showing an important portion of the control device for a breaker as a make break switch wherein the breaker is in a state of closing the circuit, and closing and opening torsion bars are prestressed. FIG. 2 is a diagram showing the important portion of the control device wherein the breaker is in a state of opening the circuit; the closing torsion bars are prestressed, and opening torsion bars are released.

Figure 3:
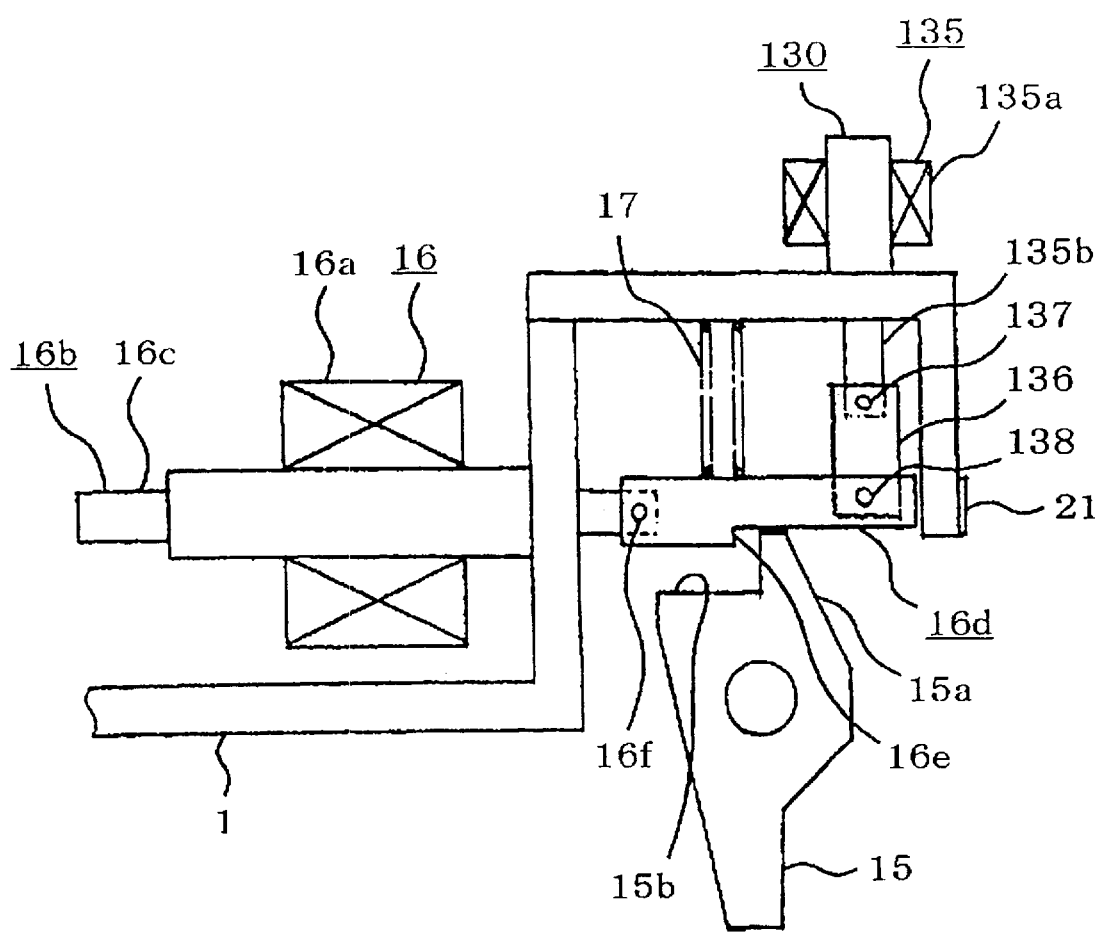
FIG. 3 is a diagram showing more in detail the construction of a making operation preventing device and elements related thereto of the control device for a breaker in FIG. 1.
Figure 4:
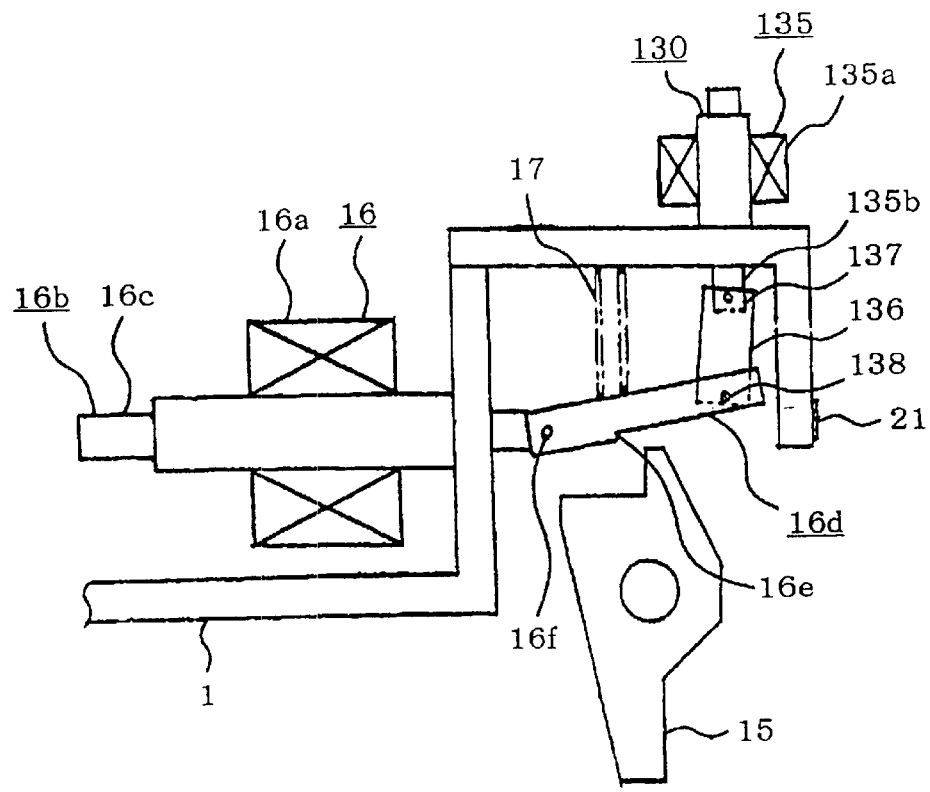
FIG. 4 is a diagram for explaining the operation of the making operation preventing device in FIG. 1.
Figure 5:
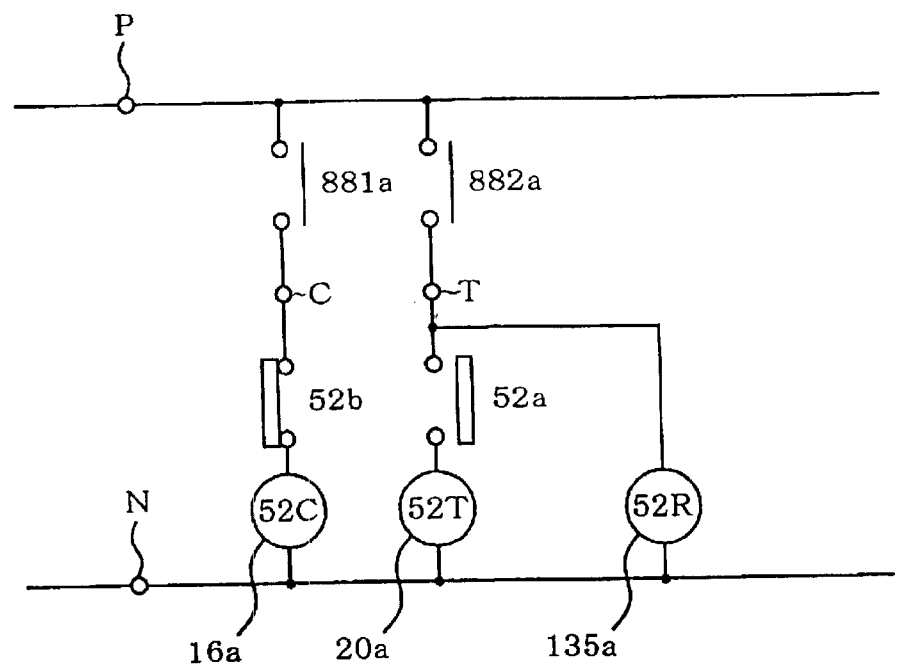
FIG. 5 is a sequence diagram of the control device for a breaker in FIG. 1.

FIG. 3 is a diagram showing in detail a making operation preventing device and elements related thereto of the control device for a breaker. FIG. 4 is a diagram for explaining the operation of the making operation preventing device. FIG. 5 is a sequence diagram of the control device for a circuit breaker. The control device for a breaker in this embodiment is substantially the same as the conventional control device shown in FIGS. 25 to 31 except that a making operation preventing device 130 is provided in the making electromagnet 16 of the conventional control device. Accordingly, the same numerical references as in FIGS. 25–31 are used for explaining the construction of this embodiment.

In FIGS. 1 to 5, numerical reference 1 designates a casing, numerical reference 24 designates a cylinder fixed to the casing 1 and numerical references 26 and 27 designate levers fitted to pins (not shown) provided at an end face of the cylinder 24 so as to be capable of rotating. Numerical references 28 and 34 designate torsion bars as a prestressing means for opening circuit (hereinbelow, referred to as opening torsion bars), and numerical references 29 and 35 designate torsion bars as a prestressing means for closing circuit (hereinbelow, referred to as closing torsion bars). In order to prestress the opening torsion bars 28 and 34 by releasing the closing torsion bars 29 and 35, energy stored by the closing torsion bars 29, 35 is made larger than energy stored by the opening torsion bars 28, 34. The opening torsion bar 28 has an end fixed to the casing 1 and the other end fixed to the lever 26. The opening torsion bar 34 has an end fixed to a rotating shaft 32 and the other end fixed to the lever 26.

The closing torsion bar 29 has an end fixed to the casing 1 and the other end fixed to the lever 27. The closing torsion bar 35 has an end fixed to a rotating shaft 33 and the other end fixed to the lever 27. Numerical reference 37 designates a making lever fixed to the rotating shaft 33, which is so constructed that a rotating force in a counterclockwise direction in FIG. 1 is given by the closing torsion bars 29, 35. numerical reference 2 designates a camshaft supported by the casing 1; numerical reference 3 a cam attached to the camshaft 2; numerical reference 13 a second pin formed in the cam, and numerical reference 14 a making latch engaged with the second pin 13. Numerical reference 15 designates a making trigger as a releasing member engaged with the making latch 14, which is provided with a head portion 15a and a corner edge portion 15b as shown in FIG. 3.

Numerical reference 16 designates a making electromagnet which has a making coil 16a and a plunger 16b as shown in detail in FIG. 3. The plunger 16b comprises a body portion 16c and a trigger lever 16d as a rotatable member connected by a pin 16f to the body portion 16c so as to be capable of rotating in a direction perpendicular to the direction of moving the body portion. The trigger lever 16d has a stepped portion 16e so as to be capable of engaging with the making trigger 15. Numerical reference 17 designates a spring to urge the trigger lever 16d in a clockwise direction so that the trigger lever 16d is held in a horizontal state in contact with a stopper (not shown) formed in the body portion 16c.

Numerical reference 21 designates a leaf spring attached to the casing 1 so as to oppose to the trigger lever 16d wherein an upper portion of the leaf spring is free with respect to the casing and it is deformable elastically in left and right directions in FIGS. 1 and 3. The plunger 16b is driven in a right direction in FIG. 3 when the making coil 16a is excited. When excitation to the making coil 16a is stopped, it is returned to the original position by the action of a return spring (not shown).

In FIG. 1, numerical reference 38 designates a rotating shaft supported by the casing 1 and driven by a motor (not shown) in a counterclockwise direction. Numerical reference 39 designates a pinion fixed to the rotating shaft 38, and numerical reference 40 designates a gear which is fixed to the cam shaft 2 to mesh with the pinion 39 and in which a part of the teeth is removed so that it disengages from the pinion 39 when the closing torsion bars 29, 35 are prestressed. Numerical reference 41 designates a link connecting the making lever 37 with the gear 40.

Numerical reference 36 designates a breaking lever fixed to the rotating shaft 32 and is so constructed as to receive a rotating force in a counterclockwise direction by the opening torsion bars 28, 34. Numerical references 8 and 9 designate respectively a first pin and a rotor attached to the breaking lever 36. Numerical reference 18 designates a releasing latch which is engaged with the first pin 8 and receives a rotating force in a clockwise direction by a spring 43.

Numerical reference 19 designates a releasing trigger engaged with the releasing latch 18, and numerical reference 20 designates a releasing electromagnet having a releasing coil 20a and a plunger 20b. The plunger 20b is driven in a right direction in FIG. 1 by exciting the releasing coil 20a. When excitation to the releasing coil 20a is stopped, the plunger 20b is returned to the original position by the action of a return spring (not shown). Numerical reference 10 designates an on-off contact of the breaker, numerical reference 12 designates a stationary contact and numerical reference 22 designates a movable contact. The movable contact 22 is connected to the breaking lever 36 via a linkage mechanism 23. Numerical reference 42 designates a buffer connected to the breaking lever 36 to relax an impact at the time of on-off operations of the movable contact 22.

Here, explanation will be made in detail as to a making operation preventing device. In FIG. 3, numerical reference 130 designates a making operation preventing device having the construction as follows. Numerical reference 135 designates an interlocking electromagnet comprising a coil 135a and a plunger 135b. When the coil 135a is excited, the plunger 135b is moved upward, and when the excitation to the coil 135a is stopped, the plunger is returned to the original position by a spring (not shown).

Numerical reference 136 designates a link as a movable member and numerical reference 137 designates a pin, wherein the link 136 is connected to the plunger 135b of the interlocking electromagnet 135 by means of the pin 137 so as to be rotatable. Numerical reference 138 designates a pin by which the link 136 and the trigger lever 16d as a rotatable member of the plunger 16b are connected so as to be rotatable.

Next, the operational sequence of the breaker is explained with reference to FIG. 5. Numerical reference 52C represents the making coil 16a of the making electromagnet 16; numerical reference 52T represents the releasing coil 20a of the releasing electromagnet 20, and numerical reference 52R represents the coil 135a of the interlocking electromagnet 135. Numerical references 52a and 52b designate respectively a normally open contact and a normally close contact of an auxiliary switch (not shown) of the breaker. Numerical reference 881a designates a normally open contact of a circuit closing auxiliary relay (not shown) for providing a circuit closing instruction, and numerical reference 882a designates a normally open contact of a circuit opening auxiliary relay(not shown) for providing a circuit opening instruction.

The making coil 52C has a terminal at one side which is connected to a negative terminal N of a D.C. power source and the other terminal at the other side which is connected to a positive terminal P of the D.C. power source through the normally close contact 52b, the making terminal C and the normally open contact 881a of the circuit closing auxiliary relay. The releasing coil 52T has a terminal at one side which is connected to the negative terminal N of the D.C. power source and the other terminal at the other side which is connected to the positive terminal P of the D.C. power source through the normally open contact 52a, the releasing terminal T and the normally open contact 882a of the circuit closing auxiliary relay. Further, the coil 52R (135a) of the interlocking electromagnet 135 is connected across the releasing terminal T and the negative terminal N.

The other structural elements are the same as those shown in FIGS. 25 to 31, and therefore, the same numerical references are applied to the corresponding elements and description of these elements is omitted.

Operations of the making operation preventing device will be described. In a circuit opening operation, when a circuit opening instruction is generated, the normally open contact 882a of the circuit opening auxiliary relay is closed, and the releasing coil 52T (20a) and the coil 52R (135a) of the interlocking electromagnet 135 are excited (FIG. 5). Then, the plunger 20b is driven rightward from the state shown in FIG. 1 whereby the releasing trigger 19 is rotated to release the engagement between the releasing latch 18 and the breaking lever 36 with the result that the circuit opening operation is conducted. In a circuit opening state, the normally open contact 52a of the auxiliary switch is opened, and therefore, excitation to the releasing coil 52T is stopped. The series of these operations is the same as the conventional one as shown in FIGS. 25 to 31.

On the other hand, the coil 52R of the interlocking electromagnet 135 is excited. Then, the plunger 135b is driven upward and the trigger lever 16d is pulled upward by means of the link 136, whereby the trigger lever is rotated around the pin 16f by a predetermined angle in a counterclockwise direction against the action of the spring 17. As a result, the trigger lever 16d is upwardly bent, and a predetermined space exists between the stepped portion 16e and the making trigger 15 as shown in FIG. 4.

As described concerning the conventional control device, the auxiliary switch is mechanically connected to the breaking lever 36, and when it reaches the final stage of a circuit opening operation of the breaker (reference to the point P4 in FIG. 31), the normally close contact 52b is closed whereby it is possible to excite the making coil 52c.

However, when the circuit opening instruction is generated continuously after the circuit opening operation, the coil 52R of the interlocking electromagnet 135 is continuously excited because the normally open contact 882a of the circuit opening auxiliary relay is closed. In other words, when the circuit opening instruction is continued after the circuit has been opened from the state shown in FIG. 1, the trigger lever 16d still takes a state of being rotated in a counterclockwise direction, and it maintains the state as shown in FIGS. 2 and 4.

Accordingly, even when the making electromagnet 16 is excited to move the plunger 16b rightward, the making trigger 15 is never kicked. Further, even when the plunger 16b is moved rightward by a manual operation, the making trigger 15 is never kicked. Therefore, there is no possibility that the engagement between the making latch 14 and the pin 13 is released and the on-off contact 10 is closed, as long as the interlocking electromagnet 135 is excited.

When no circuit opening instruction is generated, and the releasing terminal T is not applied with a voltage, the coil 52R of the interlocking electromagnet 135 is not excited. Then, the plunger 135b is returned downward, and the trigger lever 16d is returned to the original horizontal state. Thus, it is possible to rotate the making trigger 15.

In a circuit closing operation, if a circuit opening instruction is not generated, the interlocking electromagnet 135 is not excited, whereby the trigger lever 16d is in a horizontal state as shown in FIG. 3. In this state, when a circuit closing instruction is generated, the making coil 52C (16a) is excited, and the making trigger 15 is urged by the trigger lever 16d driven in a right hand, whereby the engagement between the making latch 14 and the pin 13 is released. Then, by a releasing force of the closing torsion bars 29, 35, the on-off contact 10 is closed, and at the same time, the opening torsion bars 28, 34 are prestressed. The series of these operations is the same as the operations in the conventional technique as shown in FIGS. 25 to 31.

While circuit opening instruction is generated, it is impossible to conduct a circuit closing operation because the interlocking electromagnet 135 is excited as described above.

As mentioned above, according to this embodiment, the interlocking electromagnet 135 is excited while the circuit opening instruction is generated. Accordingly, there is no danger that the on-off contact 10 is closed even when the making electromagnet 16 is erroneously excited or the plunger 16b is moved mechanically, since, reliability on a circuit opening state of the breaker is improved.

EMBODIMENT 2

Figure 6:
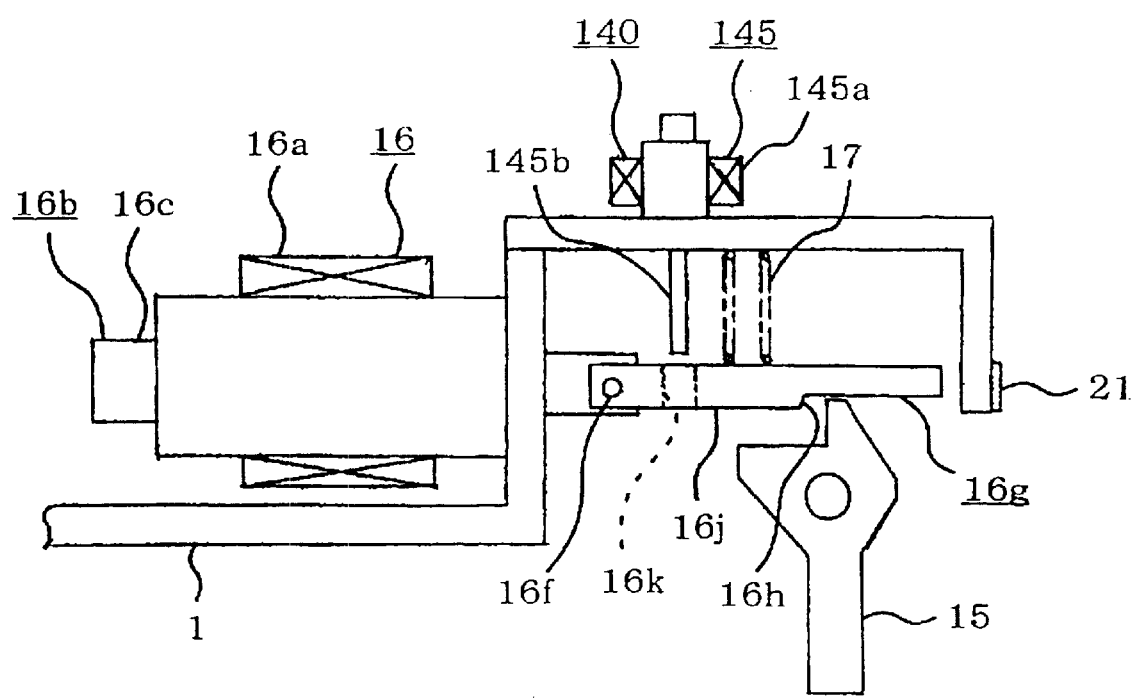
FIG. 6 is a diagram showing in detail the construction of a making operation preventing device and elements related thereto of the control device for a breaker according to another embodiment of the present invention.
Figure 7:
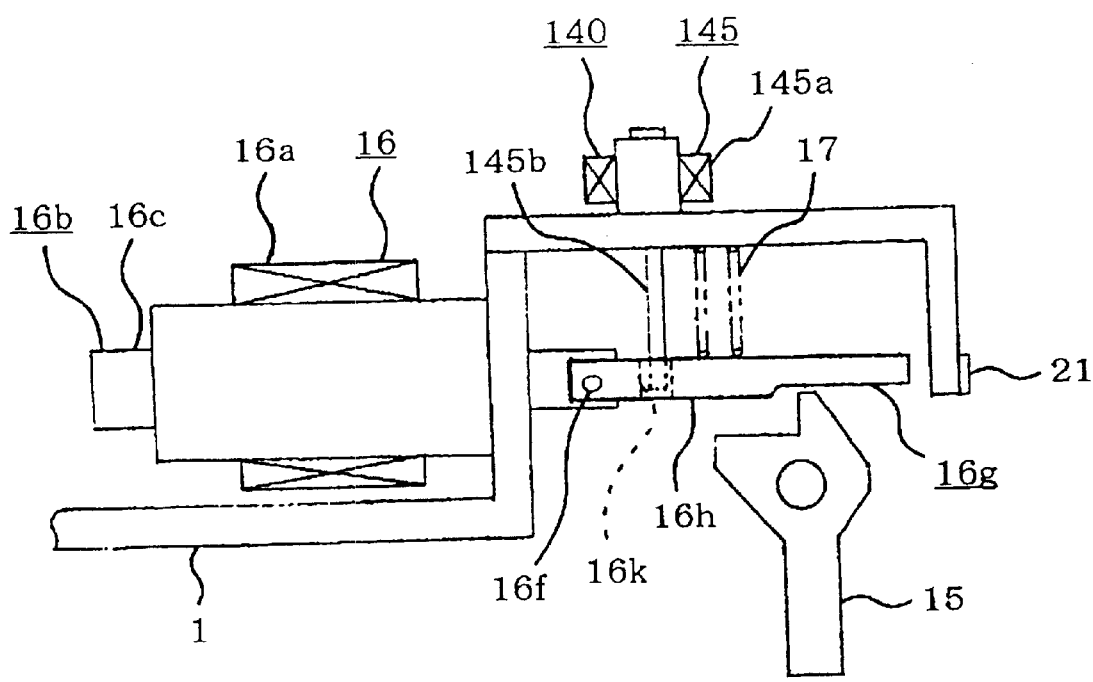
FIG. 7 is a diagram for explaining the operation of the making operation preventing device in FIG. 6.

FIGS. 6 and 7 show a making operation preventing device according to another embodiment of the present invention, wherein FIG. 6 is a diagram showing in detail the construction of the making operation preventing device and elements related thereto of the control device for a breaker, and FIG. 7 is a diagram for explaining the operation of the making operation preventing device.

In FIGS. 6 and 7, numerical reference 140 designates a making operation preventing device having the construction as follows. Numerical reference 16g designates a trigger lever as a releasing member, which is provided with a stepped portion 16h capable of engaging with a making trigger 15 and a locking hole forming portion 16j in which a circular locking hole 16k is formed. The trigger lever 16g is connected to a body portion 16c of the plunger 16b of a making electromagnet 16 by means of a pin 16f so as to be rotatable in a direction crossing a direction of moving the body portion 16c. The trigger lever 16g is urged by a spring 17 so that it is rotated around the pin 16f in a clockwise direction, and it is kept in a horizontal state by the contact with a stopper (not shown) provided in the body portion 16c.

Numerical reference 145 designates an interlocking electromagnet provided with a coil 145a and a plunger 145b as a movable member, which is moved downward when the coil 145a is excited. The plunger 145b is arranged at an upper side of the locking hole forming portion 16j so as to be inserted into and retracted from the locking hole 16k.

In the control device for a breaker of this embodiment, structural elements other than those as shown in FIGS. 6 and 7 are the same as the structural elements shown in FIGS. 1 to 5.

Operations will be described. When the on-off contact is in a circuit opening state and a circuit opening instruction is continuously generated by a device of higher ranking in the circuit opening system, the electromagnet 145 is continuously excited, and the plunger 145b is in a state of being moved in a lower direction from the state of FIG. 6. At this moment, the free end portion of the plunger 145b is inserted into the locking hole 16k of the trigger lever 16g as shown in FIG. 7.

Accordingly, the movement of the plunger 16b is prevented even when the making electromagnet 16 is excited or the plunger 16b is actuated mechanically, whereby there is no possibility that the engagement between the making trigger 15 and the making latch 14 is released. Therefore, there is no danger that the engagement between the making latch 14 and the pin 13 is released, so that the on-off contact 10 is closed.

When the excitation to the interlocking electromagnet 145 is stopped, the plunger 145b is returned upward by a spring (not shown) to withdraw from the locking hole 16k. Thus, it becomes possible to rotate the making trigger 15 by means of the trigger lever 16g.

EMBODIMENT 3

Figure 8:
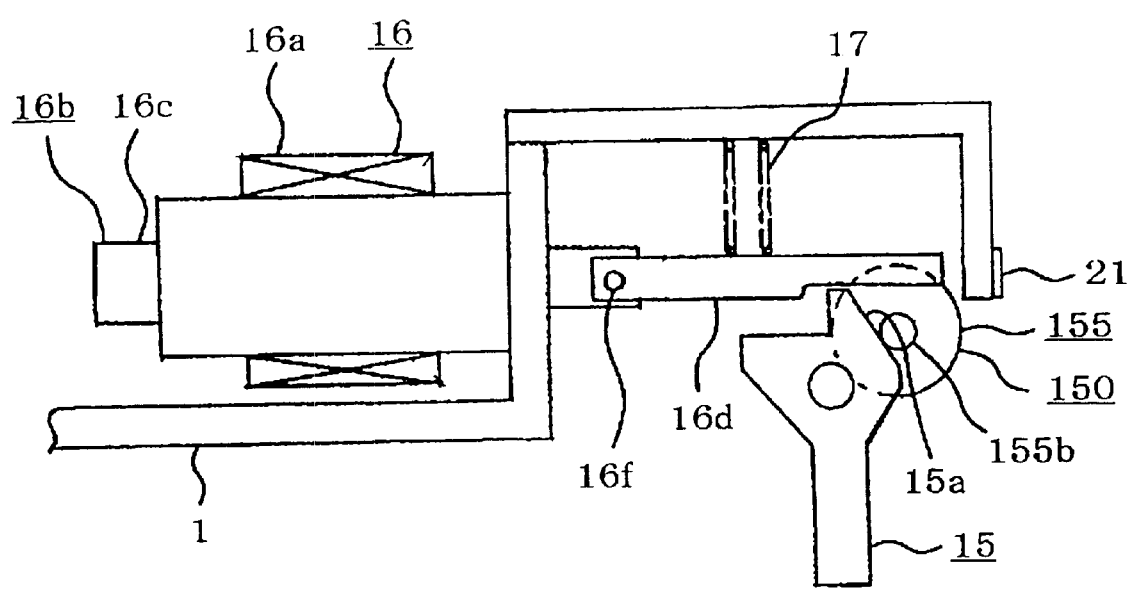
FIG. 8 is a front view showing in detail the construction of a making operation preventing device and elements related thereto of the control device for a breaker according to another embodiment of the present invention.
Figure 9:
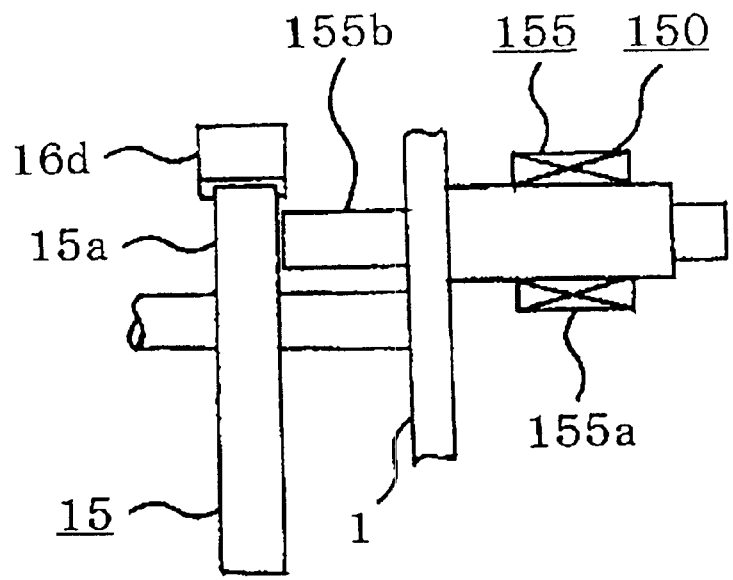
FIG. 9 is a side view showing the making operation preventing device and elements related thereto in FIG. 8.
Figure 10:
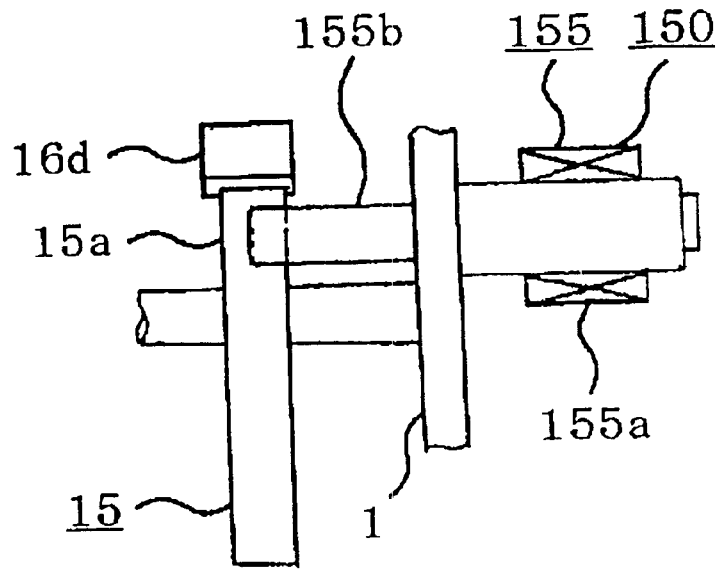
FIG. 10 is a diagram for explaining the operation of the making operation preventing device in FIG. 8.

FIGS. 8 to 10 show a making operation preventing device according to another embodiment of the present invention, wherein FIG. 8 is a front view showing in detail the construction of the making operation preventing device and elements related thereto of the control device for a breaker; FIG. 9 is a side view of the device shown in FIG. 8, and FIG. 10 is a diagram for explaining the operation of the making operation preventing device.

In FIGS. 8 to 10, numerical reference 150 designates a making operation preventing device having the construction as follows. Numerical reference 155 designates an interlocking electromagnet provided with a coil 155a and a plunger 155b as a movable member, which is moved leftward in FIG. 9 when the coil 155a is excited. As shown in FIGS. 8 to 10, the plunger 155b is arranged at a position at which it is engaged with a head portion 15a of a making trigger 15 when an interlocking electromagnet 155h is excited.

In the control device for a breaker, structural elements other than those shown in FIGS. 8 to 10 are the same as those of Embodiment 1 shown in FIGS. 1 to 5.

Operations will be described. When the on-off contact 10 is in a circuit opening state and a circuit opening instruction is generated continuously by a device of higher ranking in the circuit opening system, the electromagnet 155 is continuously excited, and the plunger 155b is moved leftward in FIG. 9, whereby the state of FIG. 10 is continued. Further, the plunger 155b restricts the making trigger 15 so as not to rotate by the engagement of the plunger 155b with the head portion 15a of the making trigger 15.

Accordingly, there is no possibility that the making trigger 15 is rotated and the engagement with the making latch 14 is released even when the making electromagnet 16 is excited or the plunger 16b is moved mechanically. Therefore, there is no danger that the engagement between the making latch 14 and the pin 13 is released, and the on-off contact 10 is closed.

EMBODIMENT 4

Figure 11:
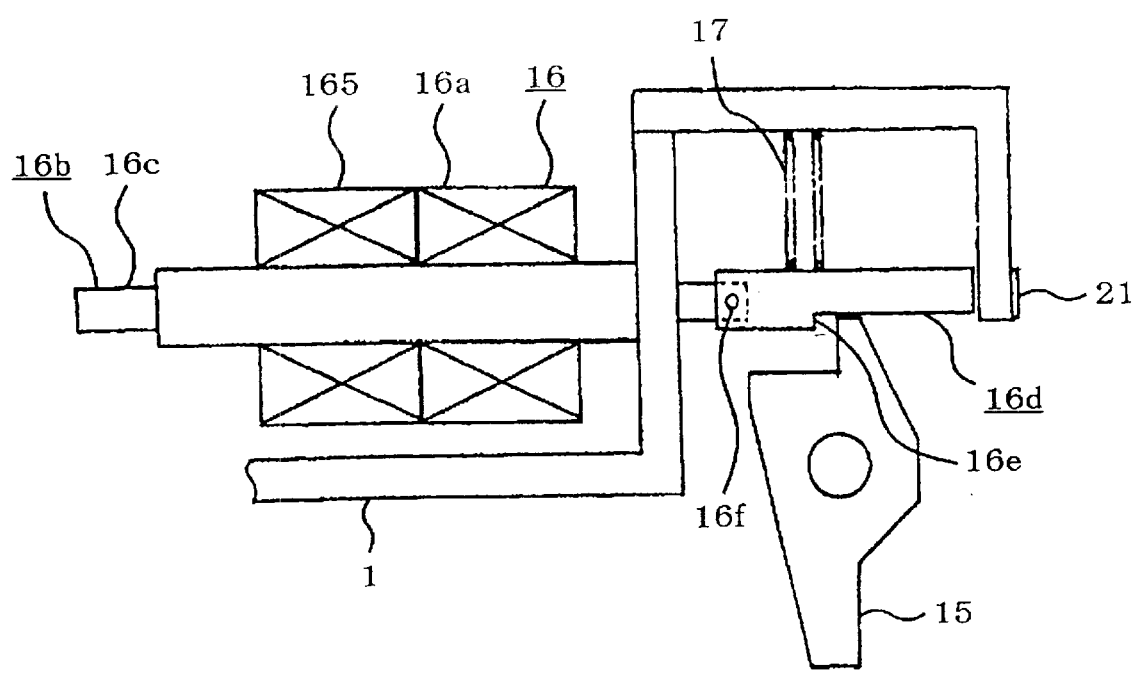
FIG. 11 is a diagram showing in detail the construction of a making operation preventing device and elements related thereto of the control device for a breaker according to another embodiment of the present invention.

FIG. 11 is a diagram showing in detail the construction of a making operation preventing device and elements related thereto for the control device for a breaker according to another embodiment of the present invention.

In FIG. 11, numerical reference 165 designates an interlocking coil as a making operation preventing device. The interlocking coil 165 is wound cylindrically in coaxial with a cylindrically wound making coil 16a in a direction opposite to the winding direction of the making coil 16a so that the ampere turn of the making coil 16a is canceled, and the ampere turn of the interlocking coil 165 is larger than the ampere turn of the making coil 16a. A trigger lever 16d is connected to a body portion 16c of a plunger 16b by means of a pin 16f so as to be rotatable in a direction crossing a direction of moving the body portion 16c. When the making coil 16a is excited, the plunger 16b is driven rightward in FIG. 11. When the excitation to the making coil 16a is stopped, the plunger 16b is returned to the original position by a return spring (not shown).

In the control device for a breaker of this embodiment, the structural elements other than those shown in FIG. 11 are the same as those of Embodiment 1 shown in FIGS. 1 to 5.

Operations will be described. When the on-off contact 10 is in a circuit opening state and a circuit opening instruction is generated continuously by a device of higher ranking in the circuit opening system, the interlocking coil 165 is excited continuously, and a force acts on the plunger 16b to urge it leftward. However, the plunger 16b is prevented from moving leftward from the state of FIG. 11 because it is in contact with a stopper (not shown).

Even though the making coil 16a of the making electromagnet 16 is excited in this state, the movement of the plunger 16b is prevented because the ampere turn of the interlocking coil 165 is larger than the ampere turn of the making coil 16a, whereby an electromagnetic force to urge the plunger 16b leftward is dominant. Accordingly, there is no possibility that the engagement between the making latch 14 and the pin 13 is released, and the on-off contact 10 is closed.

In the same manner as Embodiment 1 shown in FIGS. 1 to 5, when the circuit opening instruction disappears, excitation to the interlocking coil 165 is lost. Then, it is possible to effect a circuit closing operation by exciting the making coil 16a so that the plunger 16b is moved rightward in FIG. 11 to rotate the making trigger 15 in a clockwise direction.

EMBODIMENT 5

Figure 12:
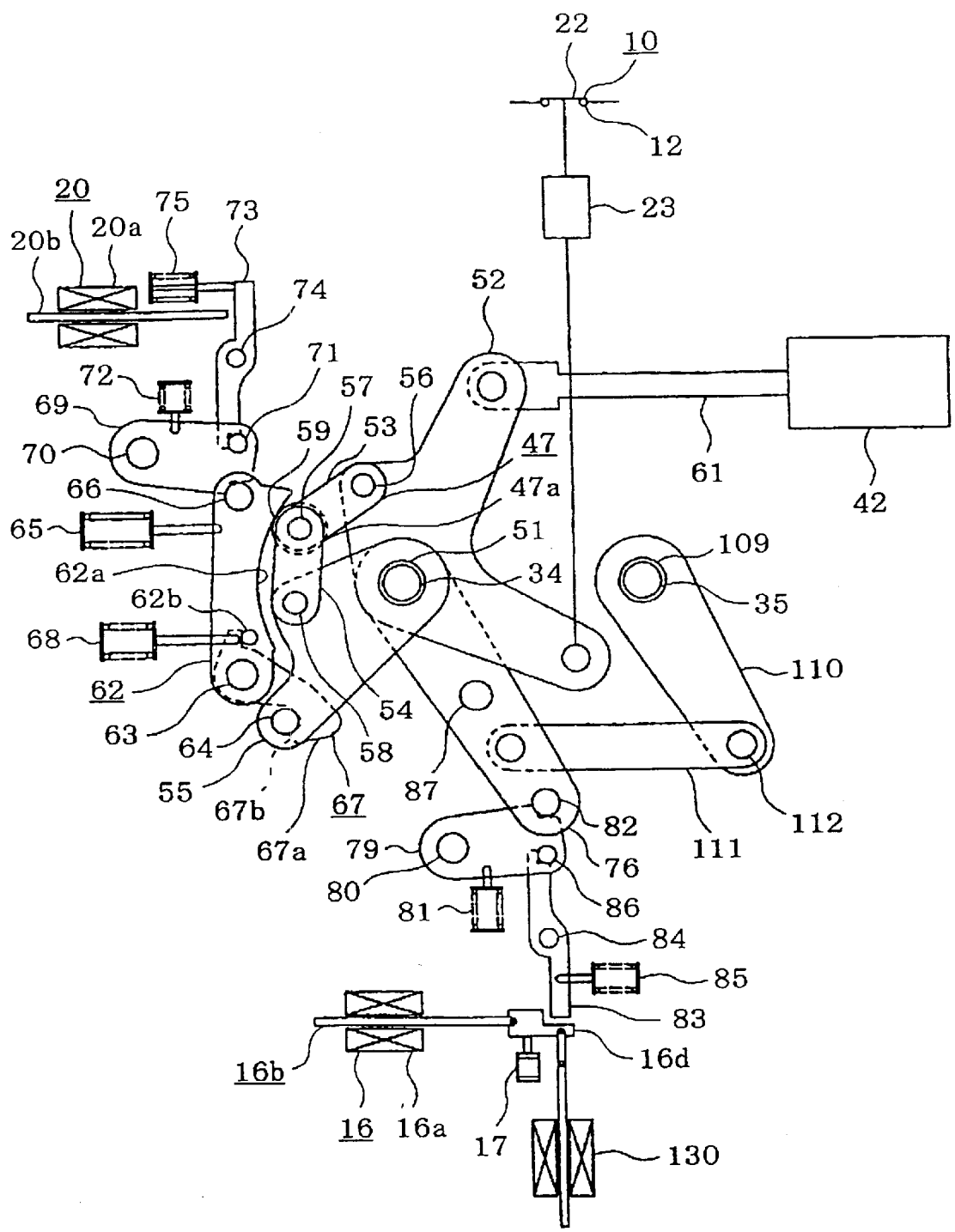
FIG. 12 is a diagram showing an important portion of the control device for a breaker in FIG. 11 wherein the breaker is in a circuit closing state, and both closing and opening torsion bars are prestressed.
Figure 13:
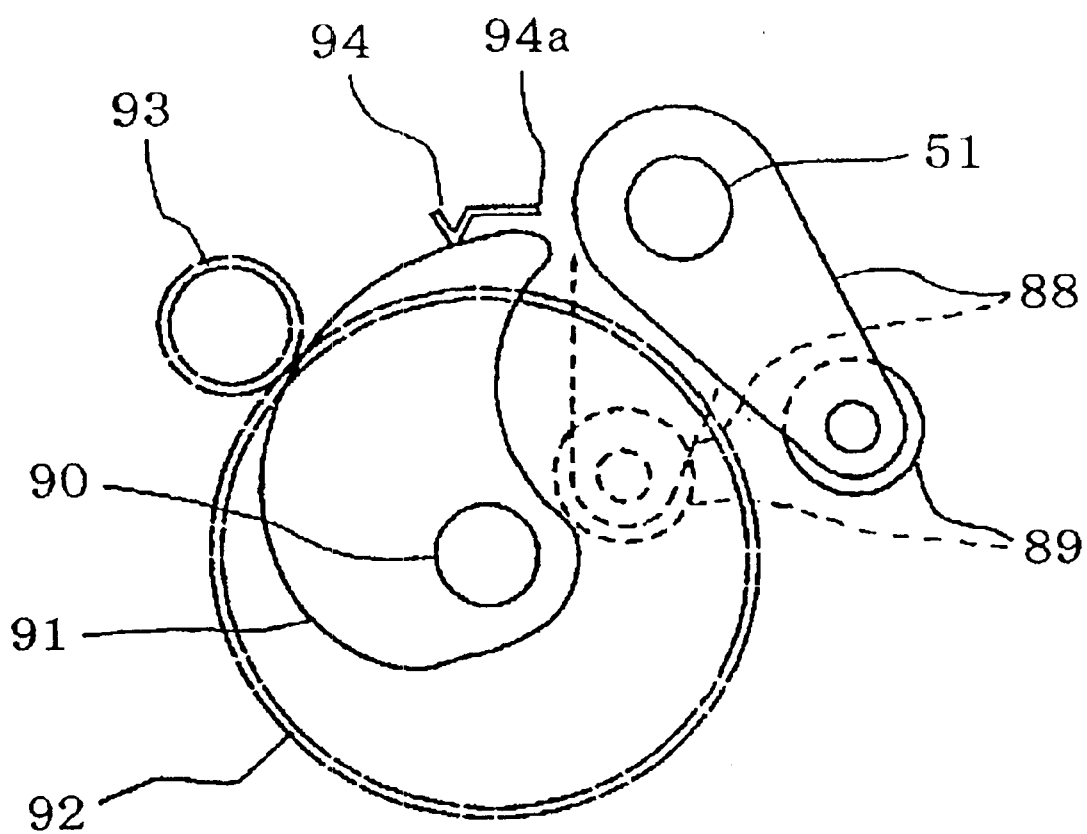
FIG. 13 is a diagram showing an important portion of a prestressing device for prestressing the closing torsion bars.

The making operation preventing device as described in Embodiments 1 to 4 is applicable also to another control device for a breaker. FIGS. 12 to 21 show another embodiment of the present invention. FIG. 12 is a diagram showing an important portion of a control device for a breaker wherein the breaker is in a state of closing the circuit, and both closing and opening torsion bars are prestressed. FIG. 13 is a diagram showing an important portion of a prestressing device for prestressing closing torsion bars in the control device for a breaker.

Figure 14:
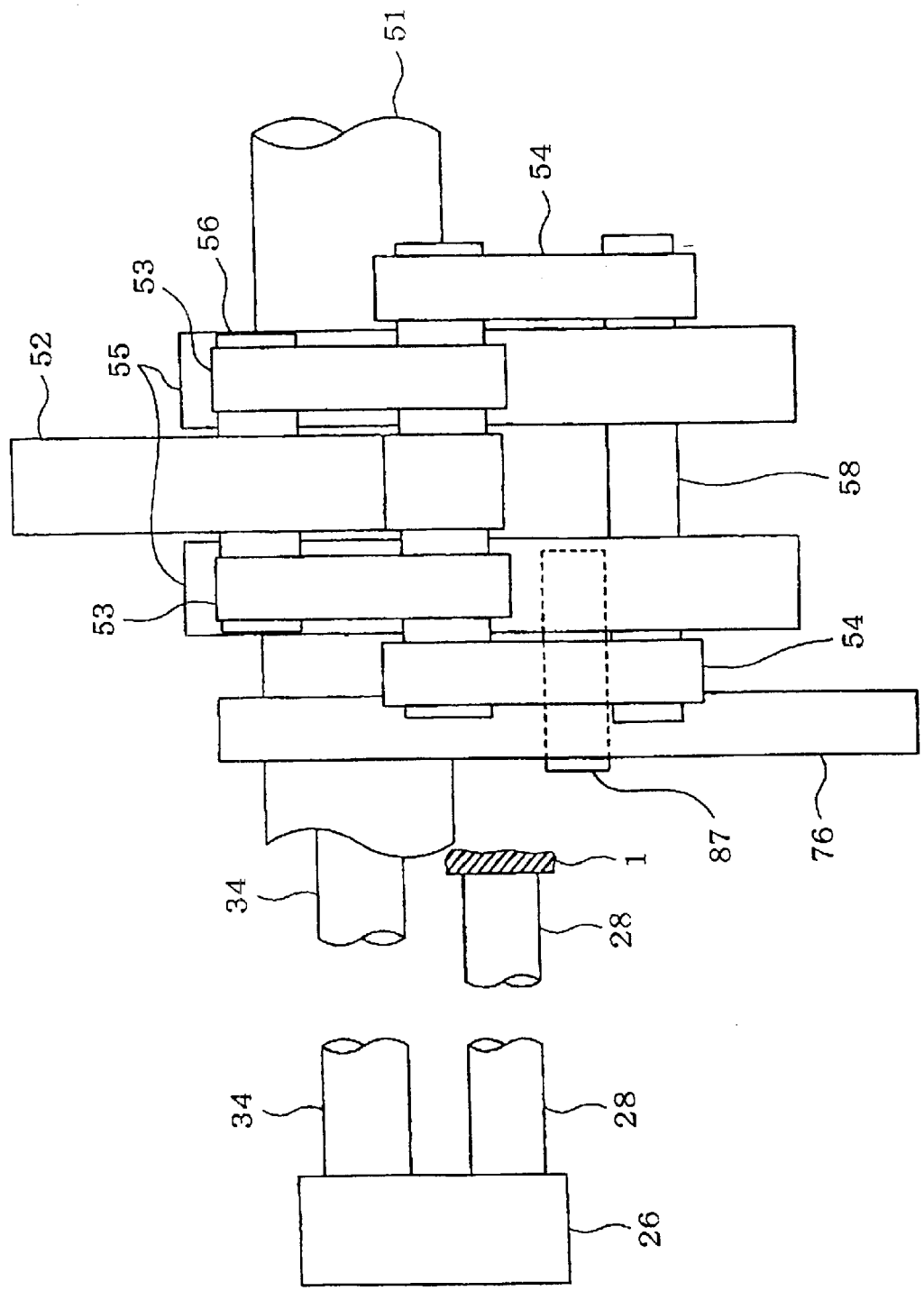
FIG. 14 is a side view of the opening torsion bars and a first breaking lever, viewed from a left side in FIG. 12.
Figure 15:
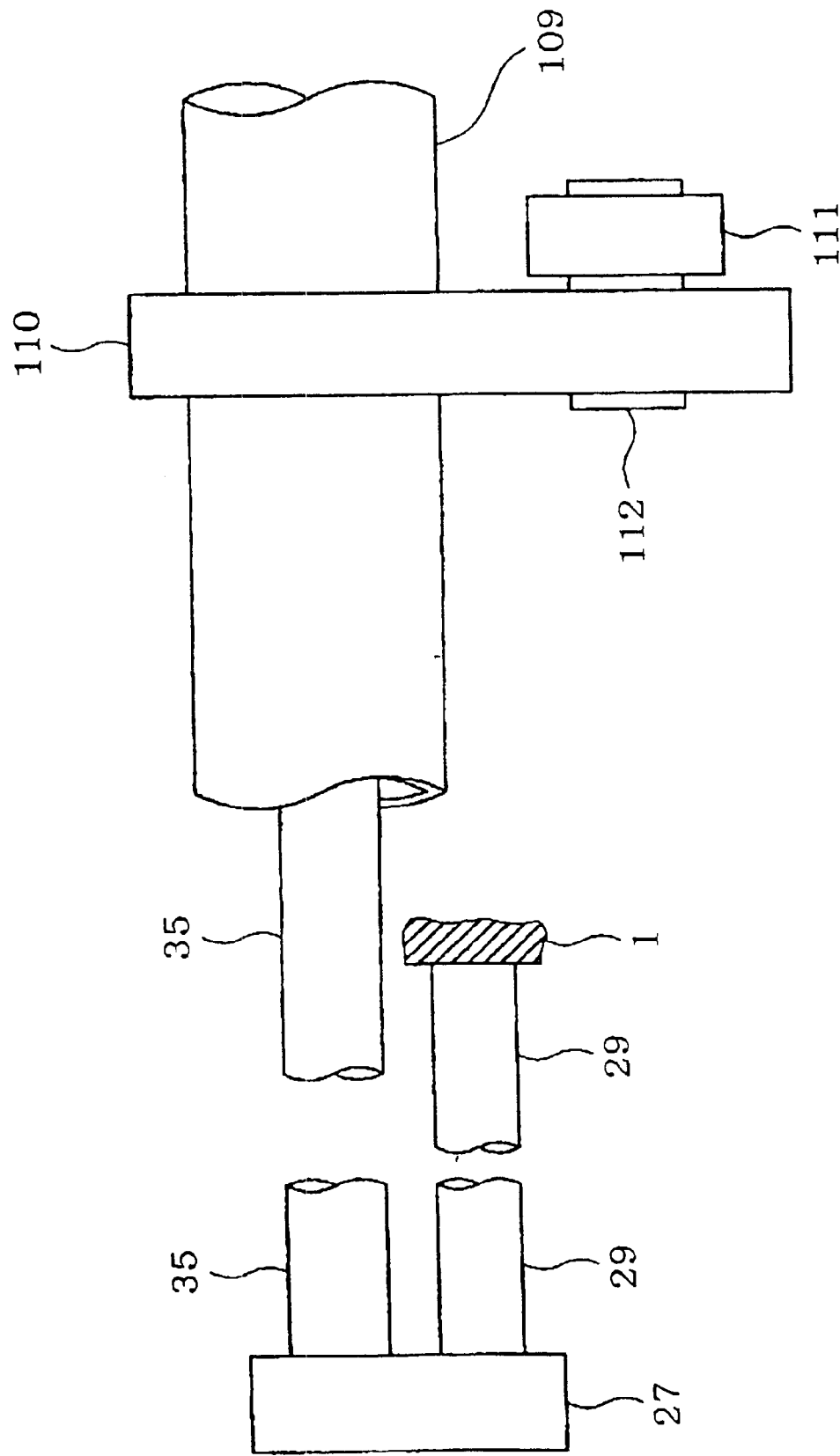
FIG. 15 is a side view of the closing torsion bars and a making lever, viewed from a left side in FIG. 12.
Figure 16:
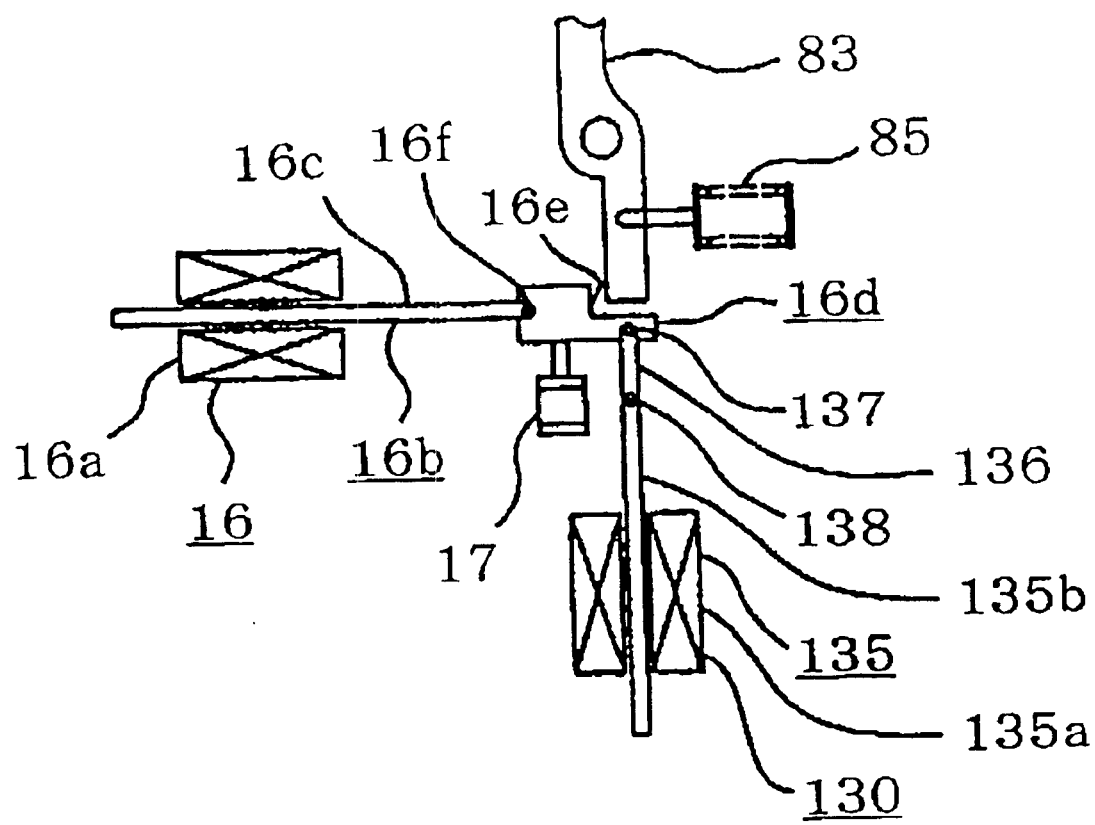
FIG. 16 is a diagram showing in detail the construction of the making operation preventing device and elements related thereto in FIG. 12.
Figure 17:
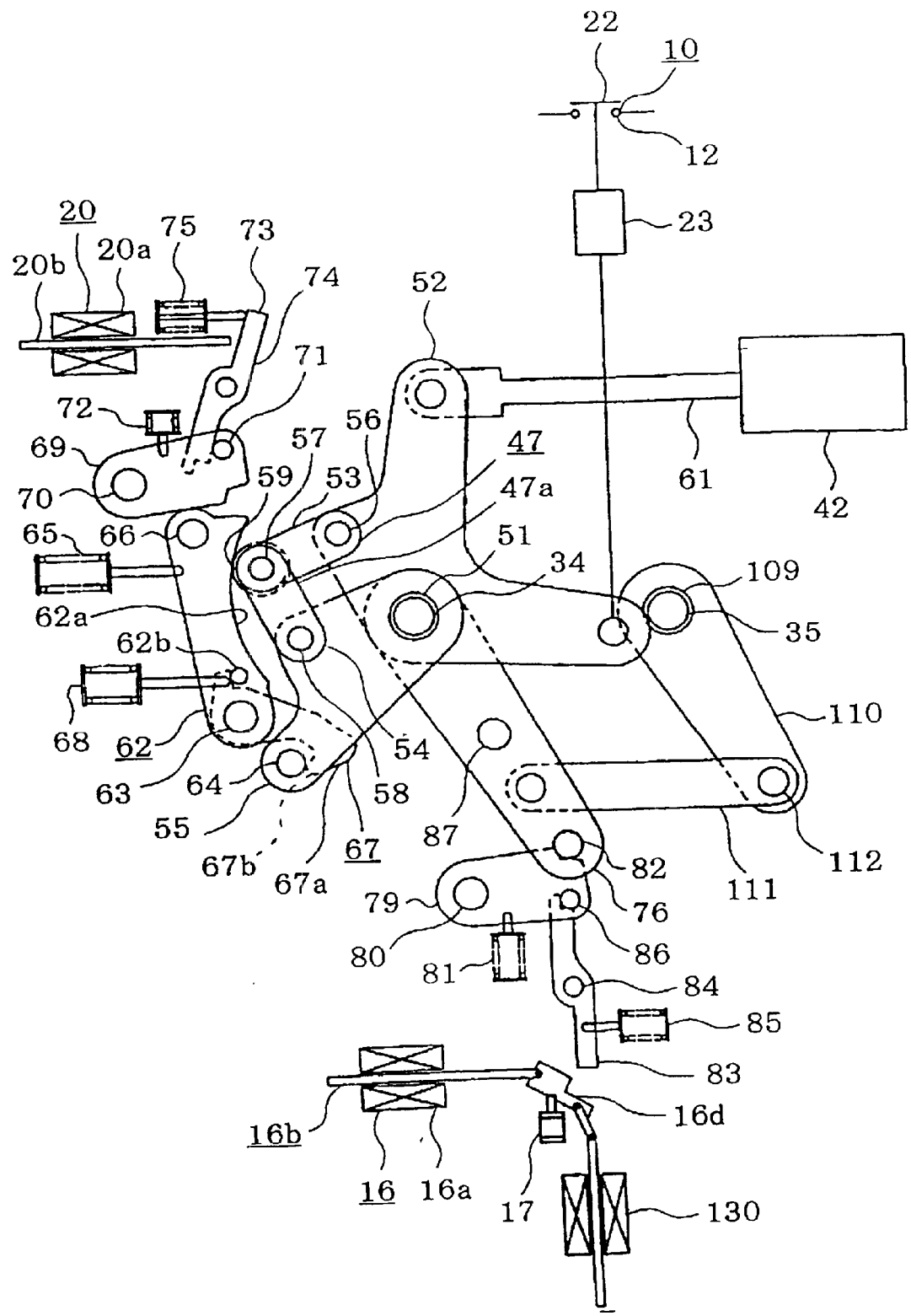
FIG. 17 is a diagram showing the important portion of the control device for a breaker in FIG. 12, wherein the diagram shows an intermediate state between the state as shown in FIG. 12 and a circuit opening operation.
Figure 18:
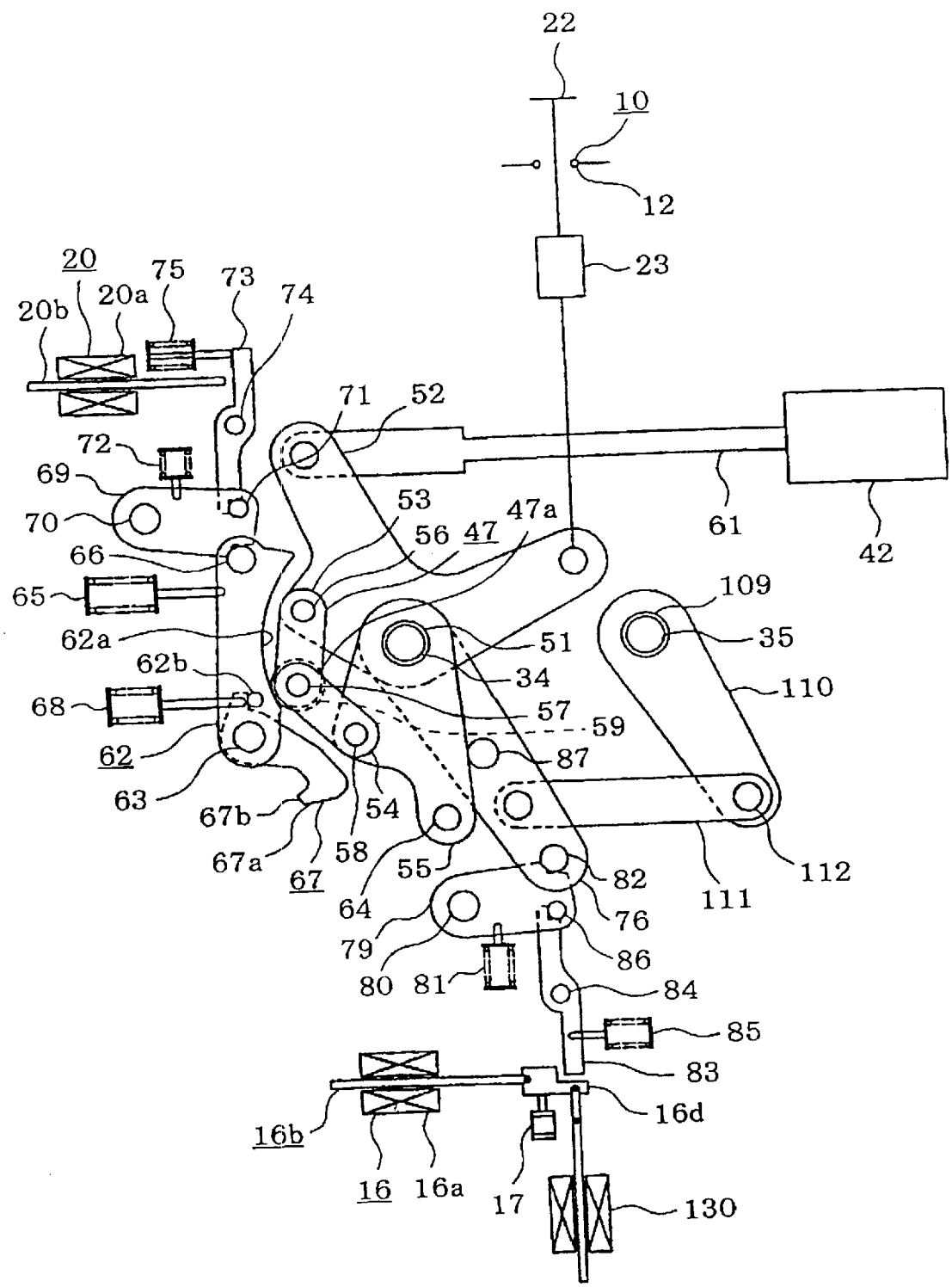
FIG. 18 is a diagram showing the important portion of the control device for a breaker in FIG. 12, which shows a state that the circuit opening operation is completed from the state as shown in FIG. 17 wherein the closing torsion bars are prestressed and the opening torsion bars are released.

FIG. 14 is a side view of the opening torsion bars and a first breaking bar, viewed from a left side of FIG. 12, and FIG. 15 is a side view of the closing torsion bars and a making lever, viewed from a left side of FIG. 12. FIG. 16 is a diagram showing in detail the construction of the making operation preventing device and elements related thereto, and FIG. 17 is a diagram showing the important portion of the control device for a breaker in which an intermediate state from the state of FIG. 12 to a circuit opening operation is shown. FIG. 18 is a diagram showing the important portion of the control device for a breaker in which a state that the circuit opening operation has been completed from the state of FIG. 12; the closing torsion bars are prestressed, and the opening torsion bars are released, is shown.

Figure 19:
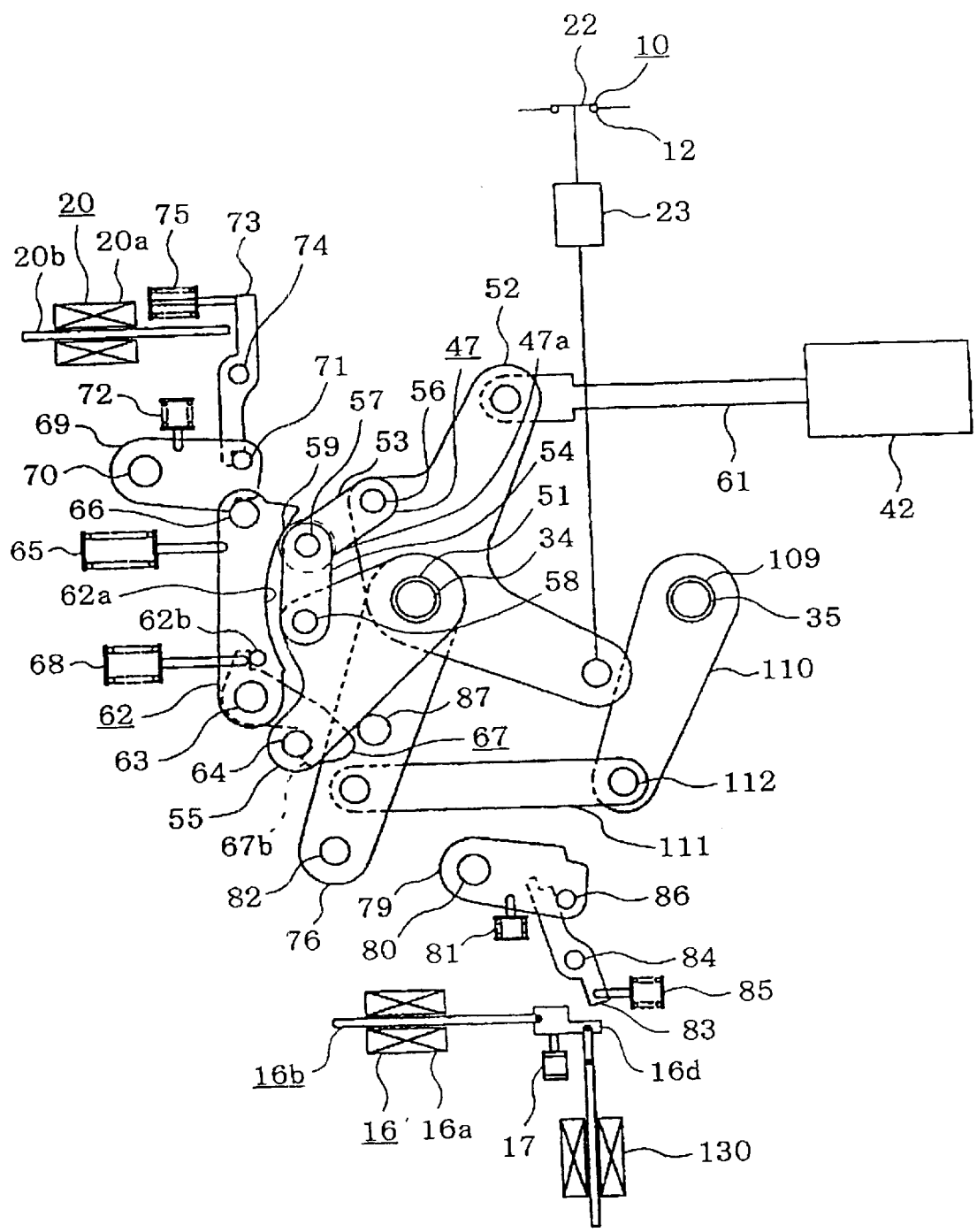
FIG. 19 is a diagram showing the important portion of the control device for a breaker in FIG. 12, which shows a state that the breaker is in a closing state wherein the closing torsion bars are released and the opening torsion bars are prestressed.
Figure 20:
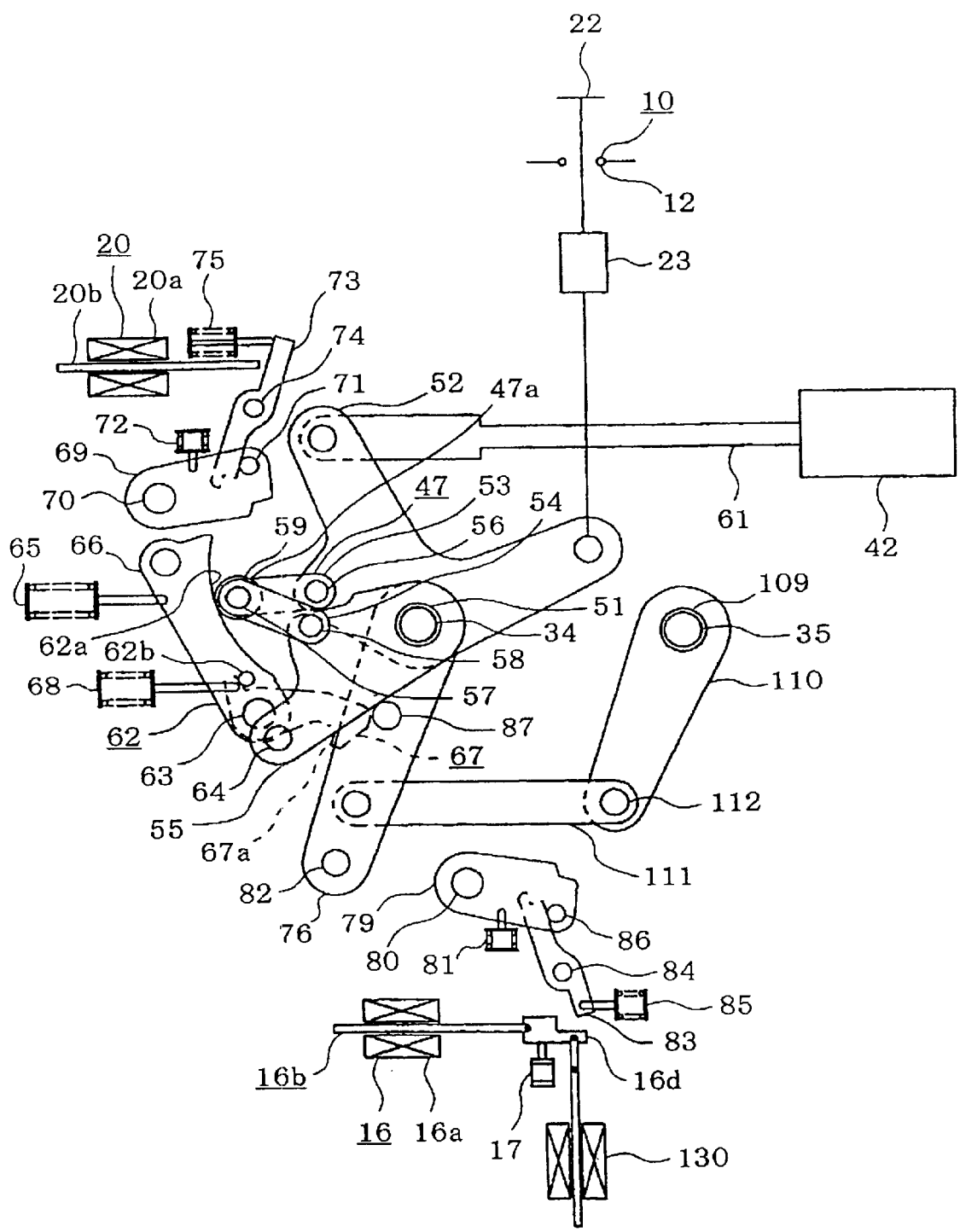
FIG. 20 is a diagram showing the important portion of the control device for a breaker in FIG. 12, which shows a state that immediately after a high-speed secondtime circuit closing operation, the second circuit opening operation has been completed, wherein the breaker is a state of opening the circuit, and both the closing and opening torsion bars are released.
Figure 21:
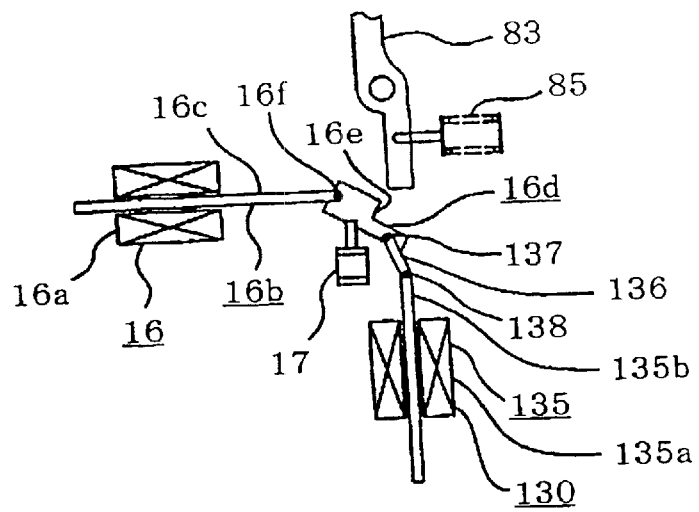
FIG. 21 is a diagram for explaining the operation of the making operation preventing device in FIG. 12.

FIG. 19 is a diagram showing the important portion of the control device for a breaker in which there is shown a state that the breaker is in a state of closing the circuit; the closing torsion bars are released, and the opening torsion bars are prestressed. FIG. 20 is a diagram showing the important portion of the control device for a circuit breaker in which there is shown a state that immediately after a high-speed second-time circuit closing operation, a second circuit opening operation has been completed wherein the breaker is a state of opening the circuit, and both the closing and opening torsion bars are released. FIG. 21 is a diagram for explaining the operation of the making operation preventing device.

The construction of the opening torsion bars will be described with reference to FIG. 14. Numerical reference 26 designates a lever fitted to a pin (not shown) provided at an end face of a cylinder (not shown but refer to the conventional cylinder 24 in FIG. 25) so as to be capable of rotating, and numerical references 28 and 34 designates opening torsion bars. The opening torsion bar 28 has an end fixed to the casing 1 and the other end fixed to the lever 26, and the opening torsion bar 34 has an end fixed to a main shaft 51 in the inside of the main shaft 51, described hereinbelow, and the other end fixed to the lever 26.

Next, the construction of the closing torsion bars will be described with reference to FIG. 15. Numerical reference 27 designates a lever fitted to a pin (not shown) provided at an end face of the cylinder (not shown but refer to the conventional cylinder 24 in FIG. 25) so as to be capable of rotating, and numerical references 29 and 35 designates closing torsion bars. The closing torsion bar 29 has an end fixed to the casing 1 and the other end fixed to the lever 27, and the closing torsion bar 35 has an end fixed to the inside of a making shaft 109, described hereinbelow, and the other end fixed to the lever 27. In order to prestress the opening torsion bars 28, 34 by releasing the closing torsion bars 29, 35, energy stored by the closing torsion bars 29, 35 is made larger than energy stored by the opening torsion bars 28, 34.

Figure 25:
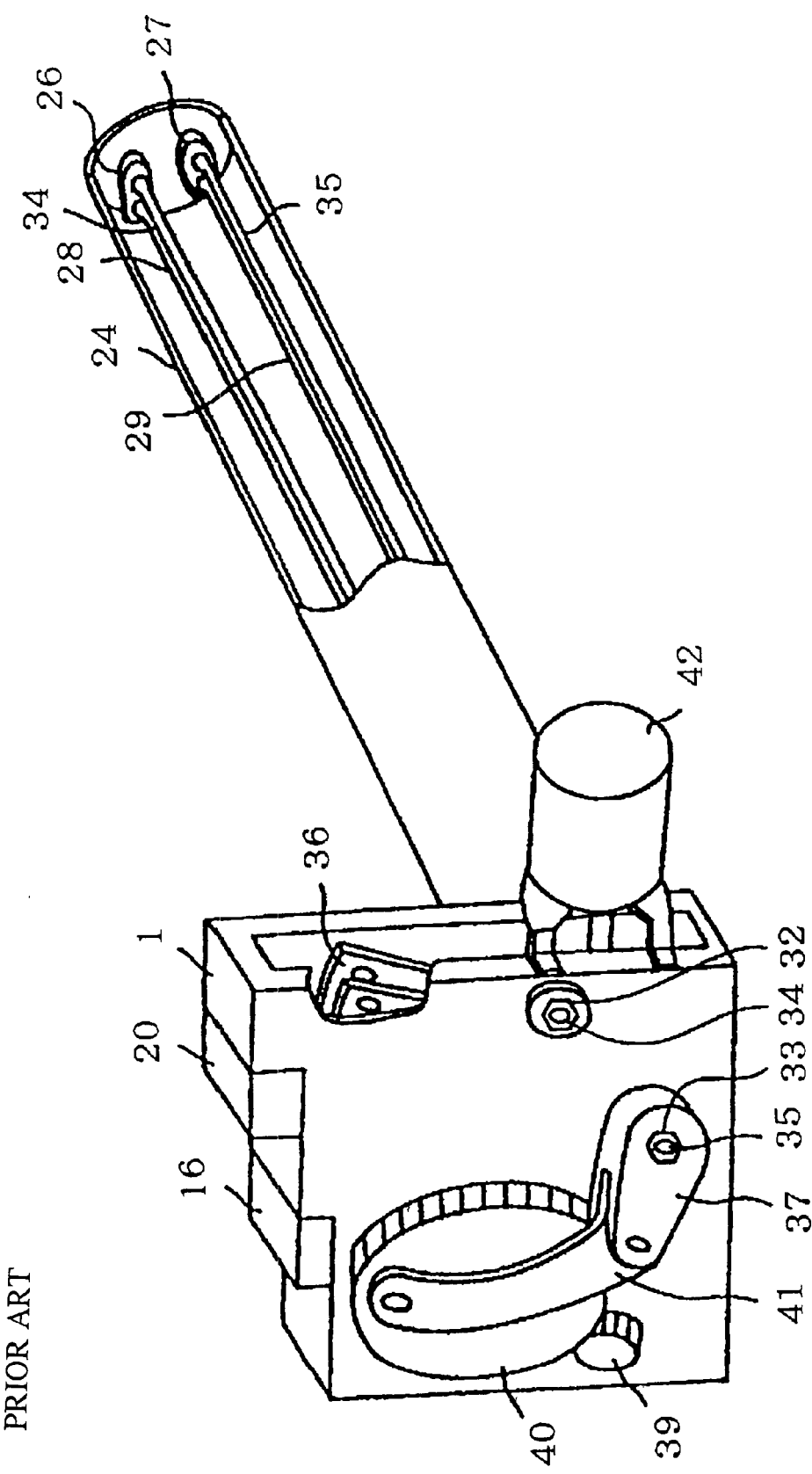
FIG. 25 is a perspective view showing the construction of a conventional control device for a breaker.
Figure 26:
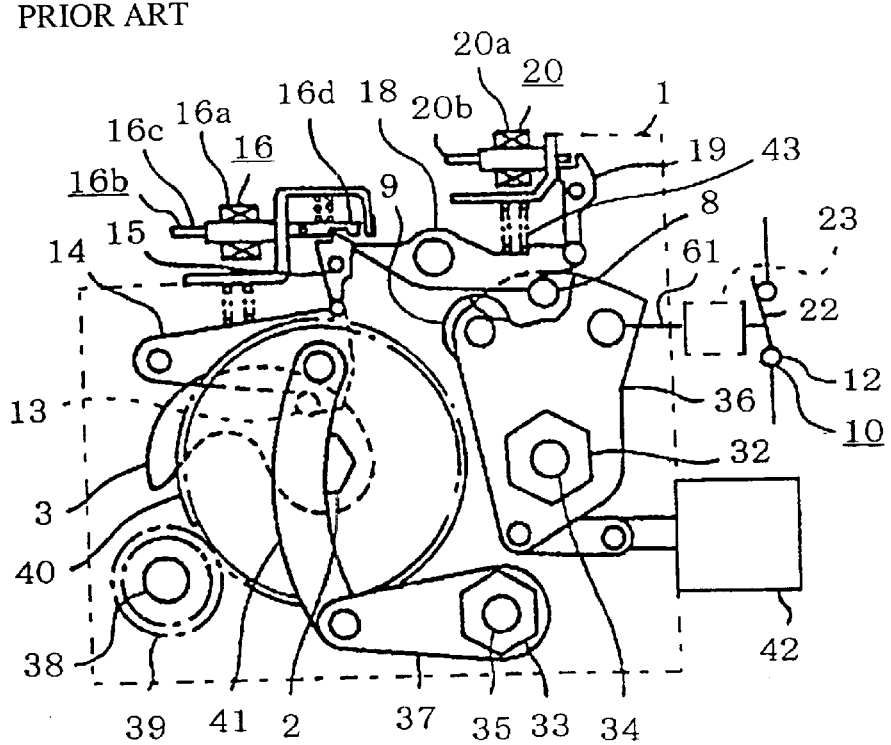
FIG. 26 is a diagram showing an important portion of the conventional operating device for a breaker wherein the breaker is in a state of closing the circuit, and both closing and opening torsion bars are prestressed.
Figure 27:
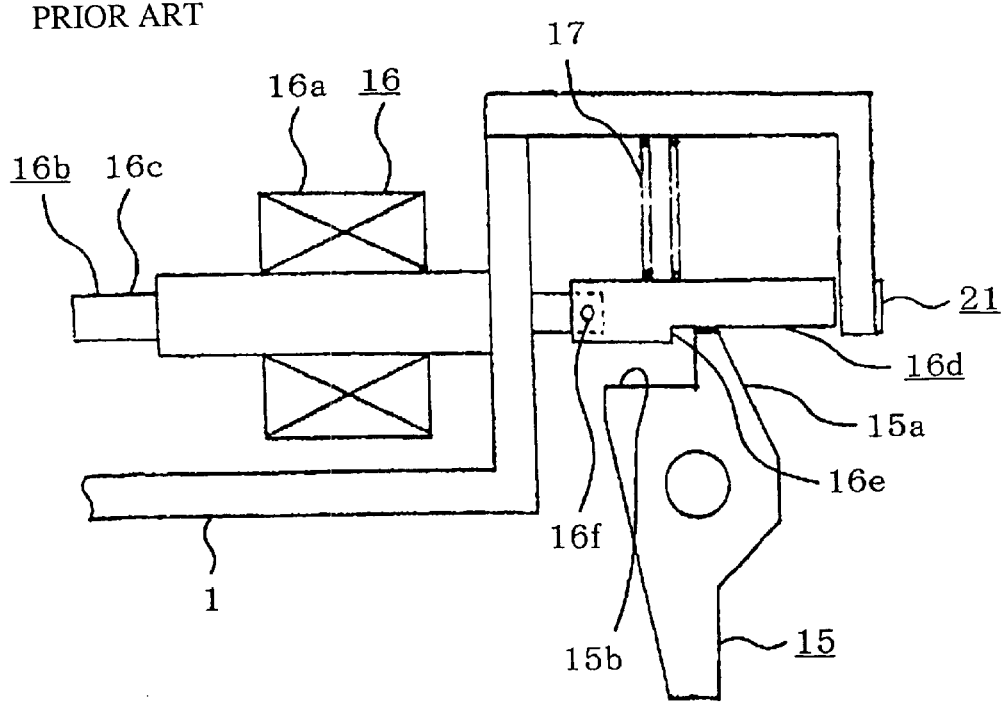
FIG. 27 is a diagram showing a conventional making electromagnet and elements related thereto.
Figure 28:
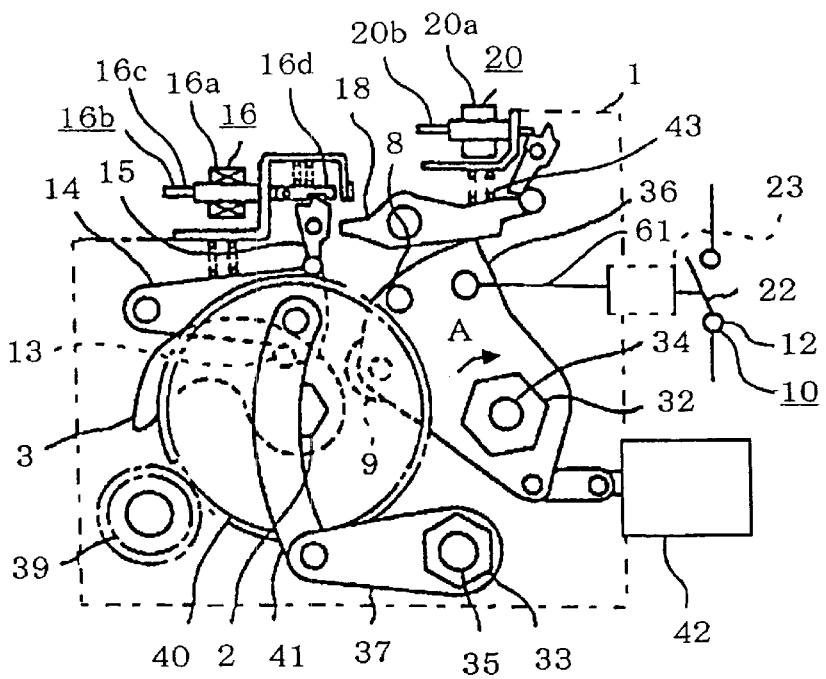
FIG. 28 is a diagram showing the important portion of the conventional control device for a breaker wherein the breaker is in a state of opening the circuit; the opening torsion bars are released and the closing torsion bars are prestressed.
Figure 29:
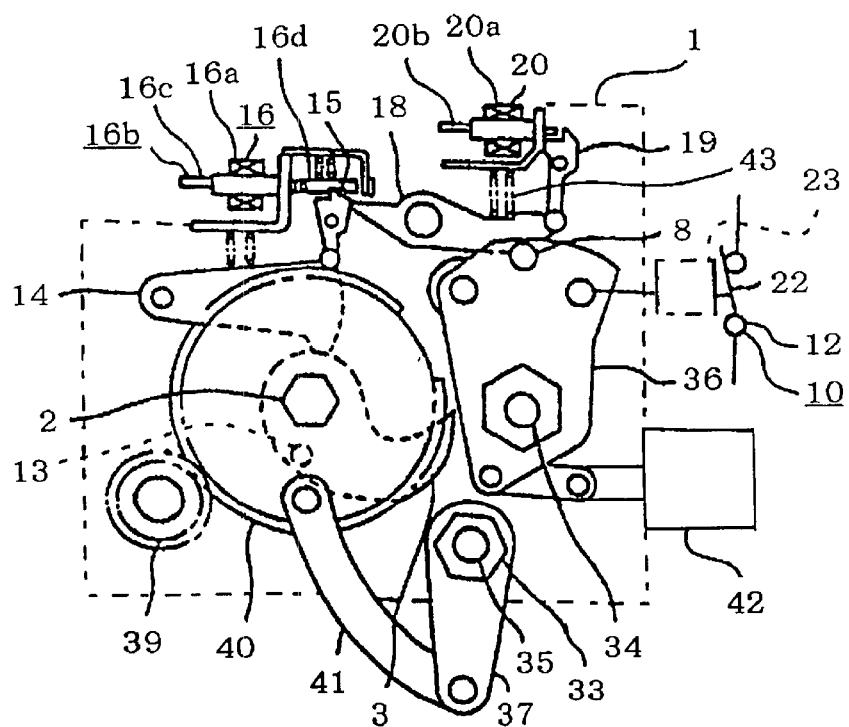
FIG. 29 is a diagram showing the important portion of the conventional control device for a breaker wherein the breaker is in a state of closing the circuit; the opening torsion bars are prestressed and the closing torsion bars are released.
Figure 30:
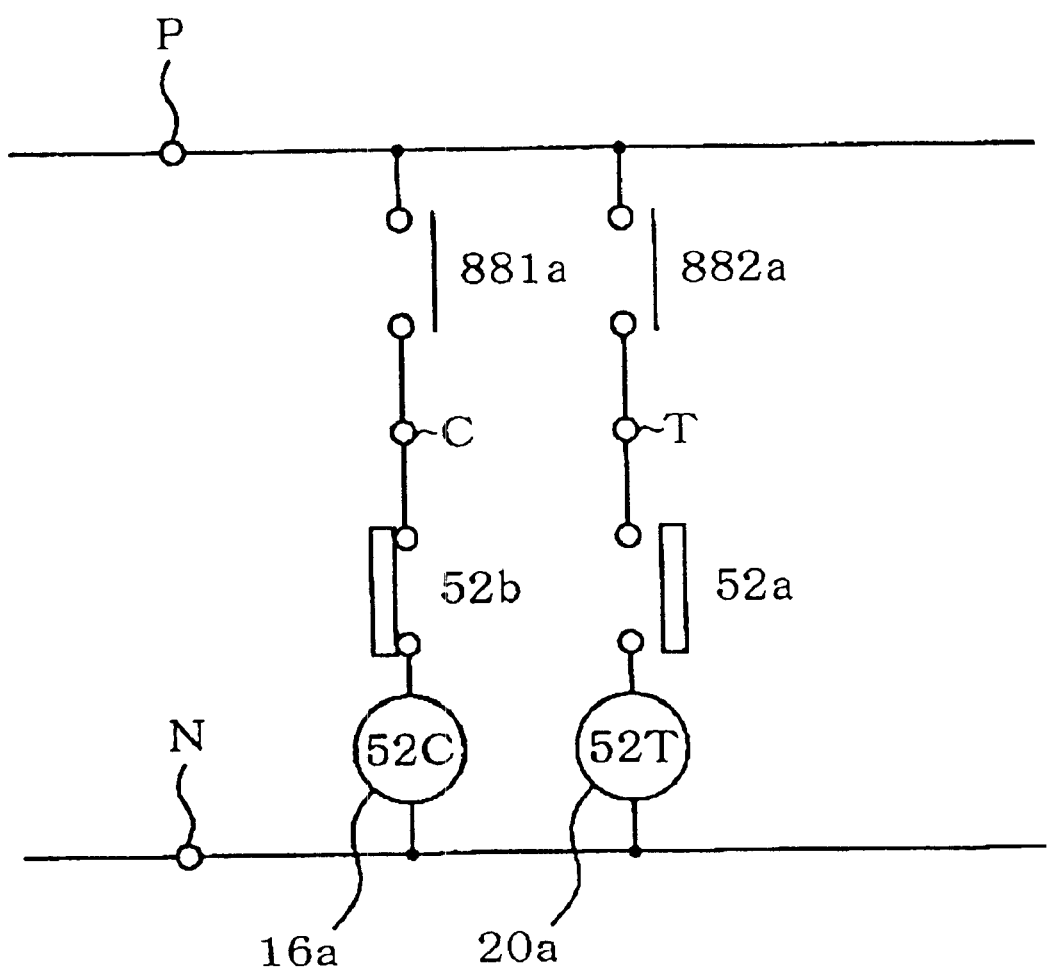
FIG. 30 is a sequence diagram of a conventional control circuit for a breaker.
Figure 31:
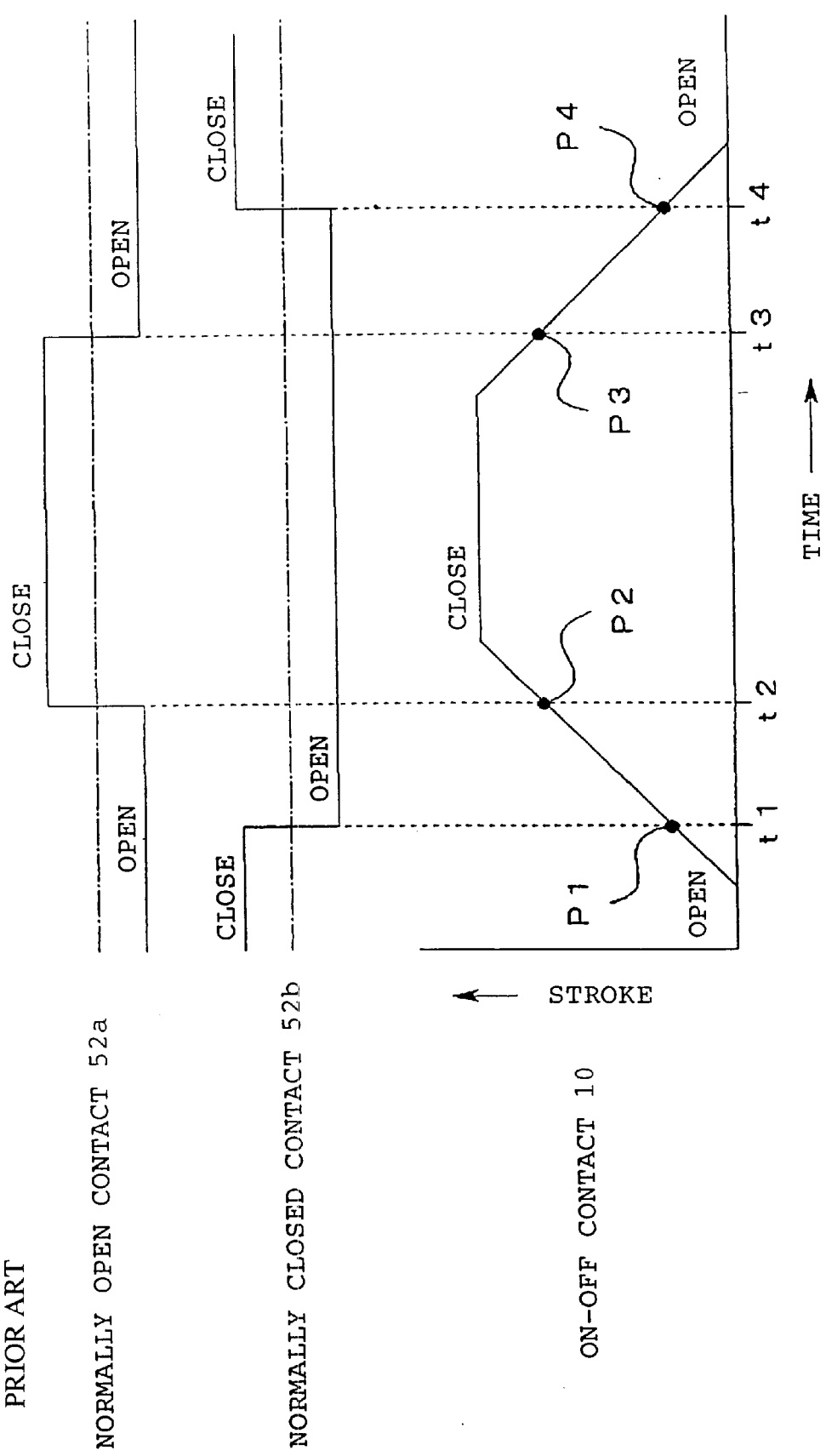
FIG. 31 is an operational chart of an auxiliary switch for the breaker.

With reference to FIGS. 12 to 21, the entire of the control device for a breaker will be described. In these Figures, the main shaft 51 is supported rotatably by the casing (although it is not shown in FIG. 12 and other Figures but the casing 1 in FIG. 25 is referred to). As described before, an end of the opening torsion bar 34 is fixed to the main shaft 51 in the inside of it (FIG. 14 is in particular referred to). Numerical reference 52 designates a first breaking lever fixed to the main shaft 51 on which a torque in a counterclockwise direction in FIG. 12 acts by the opening torsion bars 34, 28.

Numerical reference 53 designates a first link and reference 54 designates a second link. Numerical reference 55 designates a second breaking lever supported rotatably by the main shaft 51 (FIG. 14 is in particular referred to). Numerical reference 56 designates a pin connecting the first breaking lever 52 with the first link 53. Numerical reference 57 designates a pin connecting the first link 53 with the second link 54. Numerical reference 58 designates a pin connecting the second link 54 with the second breaking lever 55, and numerical reference 59 designates a rotor provided on the pin 57. A link device 57 is formed of the first and second links 53, 54, the pin 57 connecting these links 53, 54 so as to be capable of bending to thereby form an interconnecting portion 47a and the rotor 59 provided on the pin 57.

Numerical reference 10 designates an on-off contact for a main circuit of the breaker, numeral 12 designates a stationary contact of the breaker and numeral 22 designates a movable contact, wherein the on-off contact 10 is comprised of the both contacts 12, 22. Numerical reference 23 designates a link mechanism, and the movable contact 22 is connected to the first breaking lever 52 via the link mechanism 23. Numerical reference 42 designates a buffer and numeral 61 designates a rod, wherein the buffer 42 is connected to the first breaking lever 52 via the rod 61.

Numerical reference 62 designates a guide provided with a circular arc face 62a as a guide face and a pin 62b fixed to a body portion of the guide 62. The pin 62b is capable of engaging with a second releasing latch 67 which will be described hereinbelow. Numerical reference 63 designates a pivot shaft for supporting rotatably the guide 62. The center of the circular arc of the circular arc face 62a is determined at the axial center of the main shaft 51 in a state that the guide 62 is engaged with a first releasing latch 69 which will be described below. Numerical reference 64 designates a pin provided in the second breaking lever 55.

Numerical reference 65 designates a spring which urges the guide 62 to rotate around the pivot shaft 63 in a clockwise direction. Numerical reference 66 designates a pin formed in the guide 62. The second releasing latch 67 has an inclined face 67a at an end portion and a corner 67b, and is attached to be rotatable around the pivot shaft 63 to engage the pin 64 formed in the breaking lever 55. Numerical reference 68 designates a spring which urges the second releasing latch 67 to rotate around the pivot shaft 63 in a clockwise direction. Numerical reference 69 designates a first releasing latch and numeral 70 designates a pivot shaft.

The first releasing latch 69 is rotatable around the pivot shaft 70 to engage the pin 66.

Numerical reference 71 designates a pin provided in the first releasing latch 69, numeral 72 a spring, numeral 73 a releasing trigger and numeral 74 a pivot shaft. The spring 72 urges the first releasing latch 64 to rotate around the pivot shaft 70 in a clockwise direction. The releasing trigger 73 is rotatable around the pivot shaft 74 to engage the pin 71. Numerical reference 75 designates a spring which urges the releasing trigger 73 to rotate around the pivot shaft 74 in a counterclockwise direction. Numerical reference 20 designates a releasing electromagnet which is provided with a releasing coil 20a and a plunger 20b. The plunger 20b is driven rightward in FIG. 12 by exciting the releasing coil 20a, and is returned to the original position by a return spring (not shown) when excitation o the releasing coil 20a disappears.

Numerical reference 76 designates a making lever supported rotatably by the main shaft 51. Numerical reference 109 designates a making shaft supported rotatably by the casing. An end of the closing torsion bar 35 is connected to the making shaft 109 in its inside (FIG. 15). Numerical reference 110 designates a lever fixed to the making shaft 109. Numerical reference 111 designates a making link, and numerical reference 112 designates a pin wherein the making link 111 is connected to the making lever 76 and is connected to the lever 110 by means of the pin 112. The lever 110 receives a torque in a clockwise direction by the closing torsion bars 35, 29, and the making lever 76 also receives a torque in a clockwise direction via the link 111.

Numerical reference 79 designates a making latch, and numerical reference 80 designates a pivot shaft around which the making latch 79 is rotatable. Numerical reference 81 designates a spring to urge the making latch 79 to rotate around the pivot shaft 80 in a counterclockwise direction. Numerical reference 82 designates a pin provided on the making lever 76 so as to be engaged with the making latch 79. Numerical reference 83 designates a making trigger as a releasing member and numerical reference 84 designates a pivot shaft which mount the making trigger 83 thereon so as to be rotatable round the shaft. Numerical reference 85 designates a spring to urge the making trigger 83 to rotate around the pivot shaft 84 in a clockwise direction. Numerical reference 86 designates a pin provided on the making latch 79 so as to be engaged with the making trigger 83. Numerical reference 87 designates a pin fixed to the making lever 76, which is engaged with and disengaged from the second breaking lever 55 with the rotation of the making lever 76.

Numerical reference 16 designates a making electromagnet provided with a making coil 16a and a plunger 16b as shown in FIG. 16. The plunger 16b has a body portion 16c and a trigger lever 16d connected to the body portion 16c by means of a pin 16f so as to be rotatable in a direction crossing a direction of moving the main body 16c. The trigger lever 16d has a stepped portion 16e so as to be engageable with the making trigger 15. When the coil 135a is excited, the plunger 135b is moved downward. When excitation to the coil 135a is stopped, the plunger 16b is returned to the original position by a spring (not shown).

Numerical reference 17 designates a spring to urge the trigger lever 16d in a clockwise direction. The trigger lever 16d is stopped in a horizontal state in contact with a stopper (not shown) provided on the body portion 16c. Numerical reference 136 designates a link and numerical reference 137 designates a pin, wherein the link 136 is connected rotatably to the plunger 135b of the interlocking electromagnet 135 by means of the 137. Numerical reference 138 designates a pin which connects the link 136 with the trigger lever 16*d* so as to be rotatable.

The construction of the prestressing device for prestressing the closing torsion bars 29, 35 will be described. In FIG. 13 showing the construction of an important portion of the prestressing device, numerical reference 88 designates a lever which is fixed to the making lever 76 so as to be rotatable around the main shaft 51 together with the making lever 76. Numerical reference 89 designates a second rotor mounted on the lever 88. The position indicated by a solid line of the lever 88 and the second rotor 89 is a position that the closing torsion bars 29, 35 are in a prestressed state. When the closing torsion bars 29, 35 are released, the lever 88 and the second rotor 89 are respectively moved to the position indicated by a dotted line.

Numerical reference 90 designates a camshaft and numerical reference 91 designates a cam which is brought to contact with the second rotor 89 when the cam 91 is rotated around the camshaft 90. Numerical reference 92 designates a gear fixed to the cam and numerical reference 93 designates a pinion adapted to mesh with the gear 92, the pinion being rotated in a clockwise direction by a motor via a reduction gear (both being not shown). Numerical reference 94 designates an elastic member having an end portion 94*a* fixed, which is made elastically slide-contact with a portion of an outer peripheral portion of the cam 91 when the cam 91 is rotated around the cam shaft 90, so that the elastic member 94 controls the rotation of the cam 91.

Such control device for a breaker provides a circuit closing state, a circuit opening state, a second-time circuit-closing state and a second-time circuit-opening state sequentially in a predetermined time. Hereinbelow, these operations will be described sequentially.

FIG. 12 shows that the breaker is in a state of closing the circuit. The first breaking lever 52 is applied with a rotational force in a counterclockwise direction by the opening torsion bars 28, 34 which are prestressed. On the other hand, the second breaking lever 55 is retained because the pin 64 is engaged with the second releasing latch 67.

In this state, since the first link 53 and the second link 54 receive a force from both the first breaking lever 52 and the second breaking lever 55, there is produced a force on the rotor 59 provided at the interconnecting portion 47*a* of the link device 47 to push the circular arc face 67*a* of the guide 62. At this moment, the guide 62 receives a rotating force in a counterclockwise direction around the pivot shaft 63. However, the guide 62 is retained by the engagement between the first releasing latch 69 and the pin 66, and the first releasing latch 69 is retained by the engagement with the releasing trigger 73 by means of the pin 71. Accordingly, the guide 62 can not be rotated.

A circuit opening operation will be described. In the circuit closing state in FIG. 12, when the releasing electromagnet 20 is excited by a circuit opening instruction, the plunger 20*b* is moved rightward, and the releasing trigger 73 is rotated around the pivot shaft 74 in a clockwise direction against the spring 75. Then, the engagement between the releasing trigger 73 and the pin 71 is released, and the first releasing latch 69 is rotated in a counterclockwise direction by a counterforce from the pin 66 of the guide 62. Then, the guide 62 initiates to rotate in a counterclockwise direction against the spring 65 by the pushing force of the rotor 59 to the circular face arc 62*a* of the guide 62, whereby the first breaking lever 52, which receives a torque from the opening torsion bars 28, 34, initiates to rotate in a counterclockwise direction.

At the same time, the pin 62*b* of the guide 62 pushes the second releasing latch 67, so that the second releasing latch 67 is rotated in a counterclockwise direction against the spring 68 with the result that the engagement between the second releasing latch 67 and the pin 64 formed in the second breaking lever 55, i.e., restriction to the second breaking lever 55, is released. FIG. 17 shows such state.

Hereinbelow, a course reaching the completion of the circuit opening operation will be described with reference mainly to FIG. 17.

When restriction to the second breaking lever 55 by the second releasing latch 67 is released, the second breaking lever 55 becomes rotatable, and the guide 62 initiates to rotate by the spring 65 in a clockwise direction to push back the rotor 59. In this case, since the first breaking lever 52 continues to rotate in the counterclockwise direction, the second breaking lever 55 which becomes now rotatable, initiates to rotate in a counterclockwise direction.

Then, the second breaking lever 55 is finally stopped by the contact with the pin 87 of the making lever 76, and the positional relationship between the second breaking lever 55 and the pin 87 is as in the state shown in FIG. 18. Namely, the first breaking lever 52 is stopped at a predetermined rotation angle, and the movable contact 22 is separated from the stationary contact 12; thus, the circuit opening operation is completed.

Further, since the guide 62 is pushed by the spring 65 in a clockwise direction, it is rotated in a clockwise direction until the pin 66 is brought to engagement with the first releasing latch 69 while the guide 62 is in contact with the rotor 59 during the rotation of the second breaking lever 55 in a counterclockwise direction, and thereafter, the guide 62 is stopped by the contact with a stopper (not shown). At the same time, the first releasing latch 69 is rotated in a clockwise direction by the action of the spring 72 to engage the pin 66, and the releasing trigger 73 is rotated in a counterclockwise direction by the action of the spring 75 to engage the pin 71 of the first releasing latch 69. Thus, the guide is retained. Namely, at the completion of the circuit opening operation, the guide 62 is in a state of being engaged with the first releasing latch 69. FIG. 18 shows such state.

Now, the operation of the making operation preventing device 130 in a circuit opening time will be described. The operational sequence of the breaker is the same as that with respect to FIG. 5. Namely, when a circuit opening instruction is generated, the normally open contact 882*a* of the circuit opening auxiliary relay is closed whereby the releasing coil 52T (20*a*) and the coil 52R (135*a*) of the interlocking electromagnet 135 are excited. As soon as the releasing coil 52T is excited, the plunger 20*b* is driven rightward from the state of FIG. 12, and the engagement between the first releasing latch 69 and the guide 62 by the releasing trigger 73 is released to conduct a circuit opening operation, in the same manner as the former case. Further, when the circuit of the breaker is opened, the normally open contact 52*a* of the auxiliary switch is opened, and the excitation to the releasing coil 52T is stopped.

On the other hand, when the coil 52R of the interlocking electromagnet 135 is excited, the plunger 135*b* is driven downward, and the trigger lever 16*d* is pulled downward via the link 136, whereby the trigger lever 16*d* is rotated against the action of the spring 17 by a predetermined angle in a clockwise direction. Then, the trigger lever 16*d* is in a state of being bent. Accordingly, there is a predetermined gap between the stepped portion 16*e* and the making trigger 83 as shown in FIG. 21.

As described above, the auxiliary switch is connected mechanically to the breaking lever 36. When the breaker reaches a final stage of a circuit opening operation (at the point P4 in FIG. 31), the normally close contact 52b is closed so that excitation to the making coil 52C becomes possible. However, since a circuit opening instruction is generated continuously after the circuit opening operation, the coil 52R of the interlocking electromagnet 135 is continuously excited because the normally open contact 882a of the circuit opening auxiliary relay is closed.

Accordingly, the gap between the trigger lever 16d and the making trigger 83 is kept, and even when the making electromagnet 16 is excited to move the plunger 16b rightward, the making trigger 83 is never kicked. Further, even when the plunger 16b is moved rightward by a manual operation, the making trigger 83 is never kicked. Therefore, there is no danger that the engagement between the making trigger 83 and the making latch 79 is released to close the on-off contact 10 as long as the interlocking electromagnet 135 is in excitation.

When the circuit opening instruction is stopped to open the normally open contact 882a, there is no application of a voltage to the releasing terminal T, and excitation to the coil 52R of the interlocking electromagnet 135 is also stopped. Accordingly, the plunger 135b is moved upward, and the trigger lever 16d is returned to the original horizontal state where the trigger lever 16d is engaged with the making trigger 83, whereby a circuit closing operation becomes possible.

Next, description will be made as to a second-time circuit closing operation. FIG. 18 shows a state that a circuit opening operation has been completed; the closing torsion bars 29, 35 are prestressed, and the opening torsion bars 28, 34 are released. In this state, the making lever 76 is always applied with a rotating force in a clockwise direction by the closing torsion bars 29, 35 via the link 111. The making lever 76 is retained by the engagement of the pin 82 with the making latch 79, and the making latch 79 is retained by the engagement of the pin 86 with the making trigger 83, hereby the closing torsion bars 29, 35 are held in a restressed state.

When the making electromagnet 16 is excited according to a circuit closing instruction, the body portion 16c of the plunger 16b and the trigger lever 16d connected thereto are moved in a right direction, and the making trigger 83 is rotated around the pivot shaft 84 against the spring 85 in a counterclockwise direction. In this case, the interlocking electromagnet 135 is not excited, as described in detail hereinafter. Further, the trigger lever 16d is moved horizontally in a right direction.

In the rotation of the making trigger 83 around the pivot shaft 84 in a counterclockwise direction, the engagement between the making trigger 83 and the pin 86 is released, whereby the making latch 79 is rotated in a clockwise direction by a counterforce from the pin 82 of the making lever 76. Then, the making lever 76 applied with the torque from the closing torsion bars 29, 35 initiates to rotate in a clockwise direction, and at the same time, the second breaking lever 55 is pushed by the pin 87 to initiate rotation in a clockwise direction.

The guide 62 is retained by the first releasing latch 69. On the other hand, the rotor 59 is moved in contact with the circular arc face 62a of the guide 62 while it rolls around its own axis, and the rotor 59 is not permitted other than the movement along a circular arc locus around the main shaft 51 as the center. Accordingly, a unit comprising the second link 54, the rotor 59, the first link 53 and the first breaking lever 52 is rotated around the main shaft 51 in a clockwise direction in connection with the rotation of the second breaking lever 55, with the result that the movable contact 22 is driven in a direction of closing the circuit. Simultaneously, the opening torsion bars 28, 34 having its one end fixed to the first breaking lever 52 are twisted in a clockwise direction to be prestressed.

In the rotating movement of the making lever 76 in a clockwise direction, the pin 82 moves on the making latch 79 in slide contact with it to prevent the making latch 79 from rotating in a counterclockwise direction by a pushing force of the spring 81. After the making lever 76 is rotated by a predetermined angle in the clockwise direction, the contact of the pin 82 with the making latch 79 is released. Then, the making latch 79 is brought to contact with a stopper (not shown), whereby the making latch 79 is prevented from rotating in a counterclockwise direction beyond the state shown in FIG. 19.

When the second breaking lever 55 is continuously rotated, the pin 64 formed in the second breaking lever 55 is brought to contact with the inclined face 67a at the edge portion of the second releasing latch 67 so that the second releasing latch 67 is rotated in a counterclockwise direction. When the pin 64 exceeds the corner 67b, the second releasing latch 67 is rotated in a clockwise direction by the action of the spring 68, whereby the releasing latch is engaged with the pin 64 formed in the second breaking lever 55. At the same time, the first breaking lever 52 reaches a predetermined rotation angle, and the circuit closing operation and the prestressing operation of the opening torsion bars 28, 34 are completed. FIG. 19 shows such state.

Even when the making lever 76 is rotated in a counterclockwise direction so that the pin 87 is apart from the second breaking lever 55 at the time of prestressing the closing torsion bars 29, 35 (which will be described later), the opening torsion bars 28, 34 are held in a prestressed state because the pin 64 is retained by the second releasing latch 67.

Next, description will be made as to a second-time circuit opening operation. In the state of closing the circuit in FIG. 19, when the releasing electromagnet 20 is excited by a circuit opening instruction, the plunger 20b is moved a right direction, and the releasing trigger 73 is rotated around the pivot shaft 74 in a clockwise direction against the spring 75. The rotation of the releasing trigger 73 disconnects the engagement between the releasing trigger 73 and the pin 71, whereby the first releasing latch 69 is rotated in a counterclockwise direction by a counterforce from the pin 66 of the guide 62.

When the first releasing latch 69 is rotated in the counterclockwise direction to separate from the pin 66, the guide 62 initiates to rotate in a counterclockwise direction against the spring 65 because the rotor pushes the circular arc face 62a of the guide 62. Since the rotation of the guide 62 in the counterclockwise direction eliminates a support to the rotor 59 by the guide 62, the first breaking lever 52 which receives a torque from the opening torsion bars 28, 34 initiates to rotate in a counterclockwise direction, whereby the movable contact 22 is driven in a direction of opening the circuit.

Simultaneously, the pin 62b of the guide 62 pushes the second releasing latch 67, and the second releasing latch 62 is rotated in a counterclockwise direction against the spring 68 to thereby disconnect the engagement of the second releasing latch 67 with the pin 64 formed in the second breaking lever 55. The disconnection of the second releasing latch 67 from the pin 64 allows the second breaking lever 55 to rotate. However, the second breaking lever 55 does not rotate and is kept still, unlike the case that the closing torsion bars in FIG. 12 are opened from a prestressed state, because the second breaking lever 55 is in contact with the pin 87 formed in the making lever 76.

Since the first breaking lever 52 is rotated in the counterclockwise direction, the interconnecting portion 47a of the link device 47 which connects the first and the second breaking levers 52, 55 is bent, and finally, the first breaking lever 52 is stopped by contacting the pin 58. At this moment, the movable contact 22 is completely separated from the stationary contact 12, and the circuit opening operation is completed. FIG. 20 shows such state.

In the state of FIG. 19, strictly, a torque given by the closing torsion bars 29, 35 is received by a stopper (not shown) disposed in the buffer 42 through the making lever 76, the second breaking lever 55, the link device 47 and the first breaking lever 52. Accordingly, when the first releasing latch 69 is disconnected from the pin 66, and the guide 62 initiates to rotate in the counterclockwise direction so that the guide 62 does not support the rotor 59, the second breaking lever 55 is pushed by a remaining prestressing force of the closing torsion bars 29, 35 via the pin 87 and is stopped after the lever 55 has been rotated by some distance in the clockwise direction. In this state, the first breaking lever 52 is rotated in a counterclockwise direction, and accordingly, the interconnecting portion 47a of the link device 47 is bent, so that the first breaking lever 52 becomes the state of FIG. 20 in which the lever 52 is stopped by contacting the pin 58.

In this case, there is no possibility of closing the circuit again because the energy stored by the closing torsion bars 29, 35 has already been released. Even in this case, the coil 52R of the interlocking electromagnet 135 is excited so that the trigger lever 16d is pulled downward by means of the link 136, and a predetermined gap is produced between the trigger lever 16d and the making trigger 15. Accordingly, even though the making electromagnet 16 is excited, the making trigger 83 can not be kicked by the plunger 16b moving rightward.

Next, description will be made as to a prestressing operation of the closing torsion bars 29, 35. Namely, the closing torsion bars 29, 35 are prestressed from a released state in FIG. 19 or FIG. 20. The position of the lever 88 and the second rotor 89 indicated by a broken line in FIG. 13 shows the position of the closing torsion bars 29, 35 in a state of releasing energy. According to a prestressing instruction, the pinion 93 is rotated in a clockwise direction by the motor through the reduction gear (both being not shown), whereby the gear 92 and the cam 91 are rotated in a counterclockwise direction.

At an initial stage, the cam 91 pushes up the elastic member 94 to cause an elastic deformation. Then, the cam 91 separates from the elastic member 94 and pushes the rotor 89 located at a position indicated by a broken line to rotate the rotor 89 around the main shaft 51 in a counterclockwise direction. At the same time, the making lever 76 formed integrally with the lever 88 is also rotated around the main shaft 51 in a counterclockwise direction. The rotation of the making lever 76 in the counterclockwise direction twists the closing torsion bars 29, 35, one end of which is fixed to the making shaft 109, in a counterclockwise direction via the making link 111 and the lever 110; thus, the closing torsion bars 29, 35 being prestressed.

In the course of the rotation of the making lever 76 in the counterclockwise direction, the pin 82 contacts an end face of the making latch 79 and moves in slide contact with an outer peripheral portion of the latch 79. When the second rotor 89 reaches the position indicated by a solid line from the position indicated by a broken line in FIG. 13, the making latch 79 is rotated by the spring 81 in a counterclockwise direction to engage the pin 82 formed in the making lever 76. Further, the making trigger 83 is rotated by the spring 85 in a clockwise direction to engage the pin 86, whereby the making lever 76 is retained and the closing torsion bars 29, 35 are maintained in a prestressing state.

When the making lever 76 is rotated in the counterclockwise direction, the pin 87 formed in the making lever 76 also moves, and the second breaking lever 55 can be rotated in a counterclockwise direction. However, in a case of prestressing the closing torsion bars 29, 35 from the state of FIG. 19, the second breaking lever 55 is retained by the second releasing latch 67, and therefore, the second breaking lever 55 is stopped after its rotates slightly in the counterclockwise direction.

Further, in a case that the closing torsion bars 29, 35 are prestressed from the state of FIG. 20, the second breaking lever 55 is rotated in a counterclockwise direction according to the rotation of the making lever 76 in a counterclockwise direction because the spring 65 pushes the rotor 59 toward the main shaft 51 through the guide 62. Then, the guide 62 in press contact with the rotor 59 is rotated by the action of the spring 65 in a clockwise direction to restore its position at which the guide 62 is retained by means of the first releasing latch 69 and the releasing trigger 79.

Then, the driving by the motor is stopped. However, the cam 91 continues to rotate due to inertia. However, the rotation of the cam 91 is stopped by a breaking operation of the elastic member 94 because it is in slide contact with an outer peripheral portion of the cam 91. Then, the prestressing operation of the closing torsion bars 29, 35 is finished. The closing torsion bars 29, 35 are rendered to be the state of FIG. 12 in the case that they are prestressed from the state of FIG. 19, and the closing torsion bars 29, 35 are rendered to be the state of FIG. 18 in the case that they are prestressed from the state of FIG. 20. The lever 88 and the second rotor 89 of the prestressing device are respectively the positions indicated by the solid line in FIG. 13.

When the engagement between the making latch 79 and the pin 82 is released to release the closing torsion bars 29, 35 for the circuit closing operation in the state of FIG. 18, the opening torsion bars 28, 34 are prestressed, and the movable contact 22 is made contact with the stationary contact 12 to close the circuit of the breaker as shown in FIG. 19. Further, when the closing torsion bars 29, 35 are prestressed by the motor (not shown) from the state of FIG. 19, the closing torsion bars 29, 35 and the opening torsion bars 28, 34 are all returned to a prestressed state in the breaker being in a state of closing the circuit as shown in FIG. 12.

EMBODIMENT 6

Figure 22:
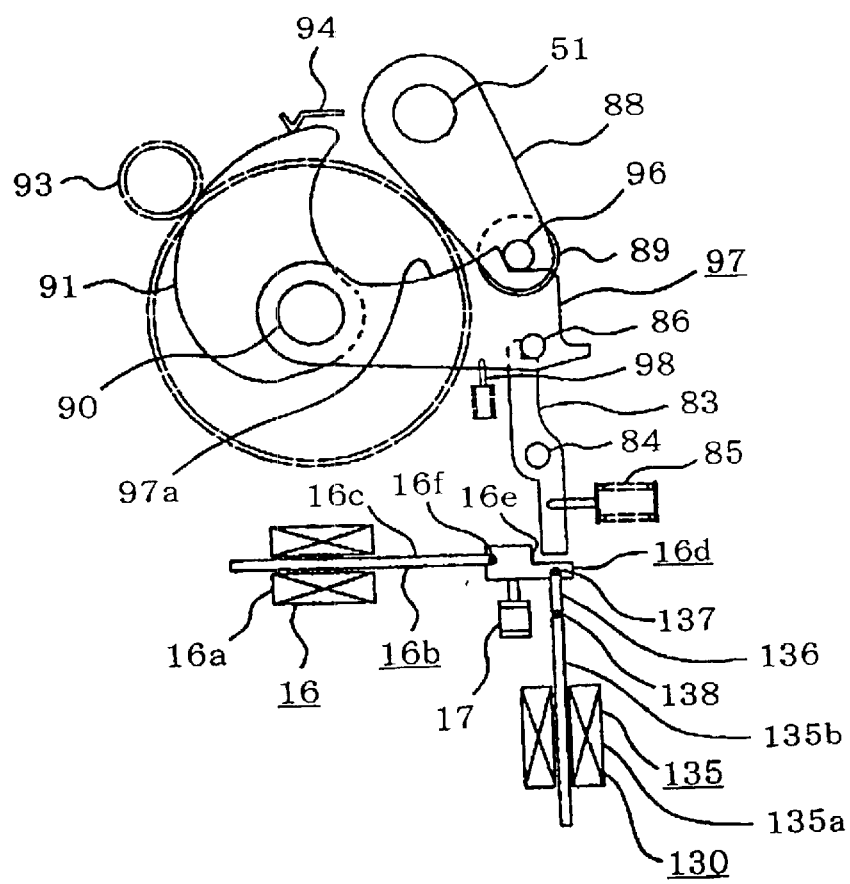
FIG. 22 is a diagram showing in detail the construction of a prestressing device and a making operation preventing device as well as elements related thereto in the control device for a breaker according to another embodiment of the present invention.
Figure 23:
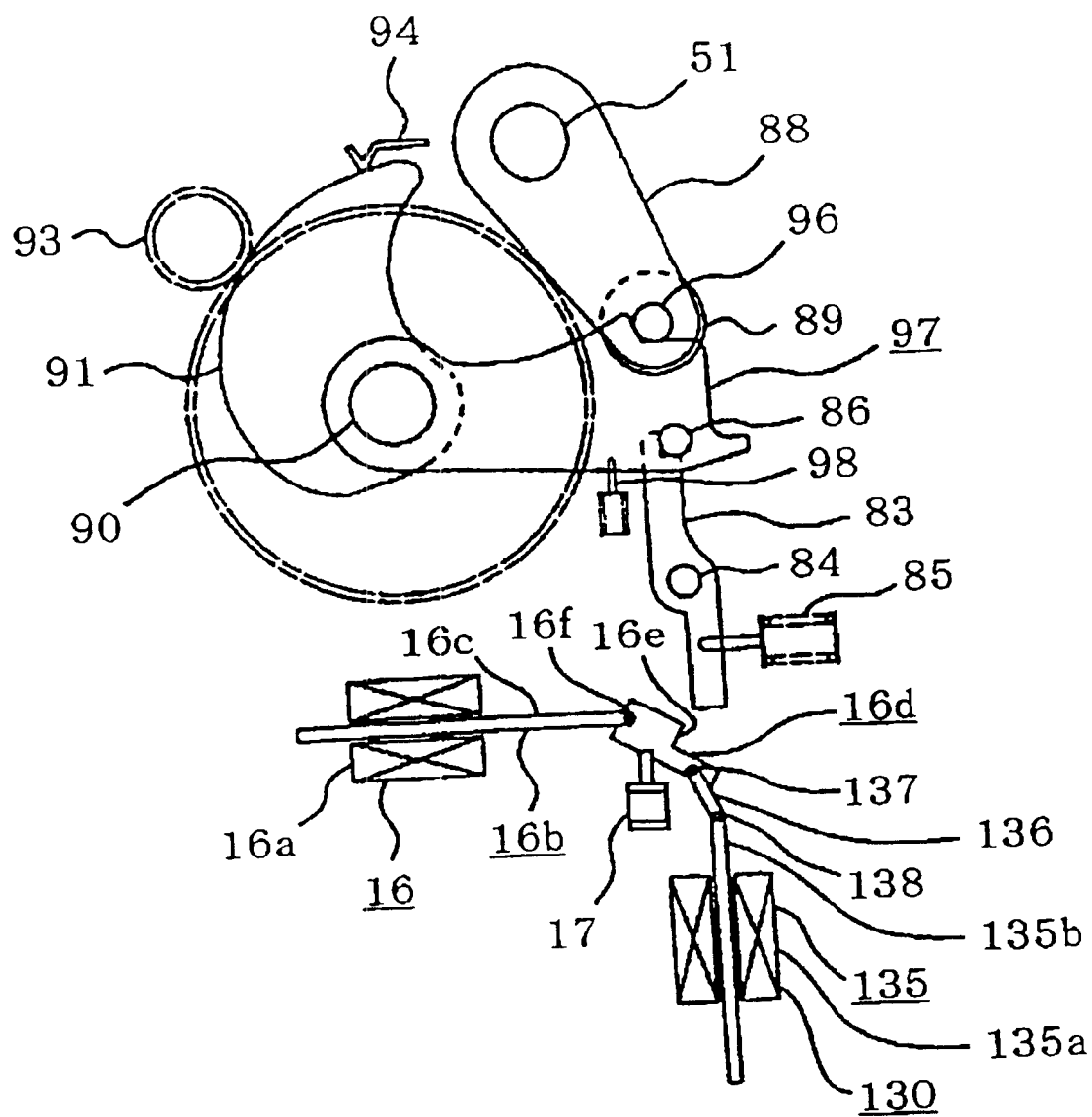
FIG. 23 is a diagram for explaining the operation of the making operation preventing device in FIG. 22.

FIGS. 22 and 23 show another embodiment of the present invention wherein FIG. 22 is a diagram showing in detail the construction of a prestressing device and a making operation preventing device as well as elements related thereto of the control device for a breaker and FIG. 23 is a diagram for explaining the operation of the making operation preventing device.

According to this embodiment, there is provided the control device in which the construction of the prestressing device and the making latch of Embodiment 5 shown in FIGS. 12 to 21 is modified and on which the making operation preventing device 130 is mounted.

First, the construction of the prestressing device will be described. In FIG. 22, numerical reference 96 designates a pivot shaft for supporting rotatably a second rotor 89 mounted on a lever 88. Numerical reference 97 designates a making latch fitted rotatably to a camshaft 90, which is used instead of the making latch 79 of Embodiment 5. Numerical reference 97a designates a curved face portion of the making latch 97. The making latch 97 is engageable with the pivot shaft 96 to retain the lever 88 and the making lever 76 fixed integrally with the lever 88 (reference to FIG. 12).

Numerical reference 98 designates a spring for urging the making latch 97 in a counterclockwise direction so that the curved face portion 97a of the making latch 97 is brought to contact with the pivot shaft 96 by a pushing force of the spring 97. In the same manner as Embodiment 5 shown in FIGS. 12 to 21, the making latch 97 is provided with a pin 86 with which a trigger 83 is engageable.

The construction other than the above-mentioned is the same as that of Embodiment 5 shown in FIGS. 12 to 21, and accordingly, the same numerical references as in those in the Figures designate the same or corresponding parts and description of these parts is omitted.

In this embodiment, since the making latch 97 and the cam 91 are attached to the camshaft 90 in common, the pivot shaft 80 in Embodiment 1 can be omitted, whereby the device can be minimized.

Further, since the construction of the making operation preventing device 130 is the same as that of Embodiment 5, the same numerical references as those of Embodiment 5 designate the same or corresponding parts, and description of these parts is omitted. Further, the other elements which are not shown in FIGS. 22 and 23 are the same as those of Embodiment 5.

Operations will be described. Since the prestressing and releasing operations of the closing torsion bars 29, 35 are substantially the same as those in Embodiment 5, a supplemental explanation is made instead of a detailed explanation. In the supplemental explanation, FIGS. 12 to 21 are also referred to in addition to FIGS. 22 and 23. A prestressing operation by the closing torsion bars 29, 35 is started from the state that the closing torsion bars 29, 35 are in a state of releasing as shown in FIG. 19 or FIG. 20.

In the state that the closing torsion bars 29, 35 are released, the lever 88 is at the position indicated by a broken line in FIG. 13. According to a prestressing instruction, the pinion 93 is rotated by the motor in a clockwise direction, and the gear 92 and the cam 91 are rotated in a counterclockwise direction.

The cam 91 pushes the rotor 89, which is located at the same position as the rotor 89 as indicated by a broken line in FIG. 13, to rotate the lever 88 around a main shaft 51 in a counterclockwise direction. At the same time, the making lever 76 formed integrally with the lever 88 is also rotated around the main shaft 51 in a counterclockwise direction. The rotation of the making lever 76 in the counterclockwise direction twists the closing torsion bars 29, 35, whose one end is connected to the making shaft 109, via the making link 111 and the lever 110 in a counterclockwise direction (reference to FIGS. 19 and 29), thus, the closing torsion bars 2, 35 are prestressed.

With the rotation of the lever 88 in the counterclockwise direction, the curved face portion 97a of the making latch 97 is rotated in a counterclockwise direction by the pivot shaft 96. When the second rotor 89 reaches a position indicated by a solid line in FIG. 22 from the position which is the same as the position indicated by the broken line in FIG. 13, the making latch 97 is rotated by the spring 98 in a counterclockwise direction to thereby engage the pivot shaft 96 provided on the lever 88. The making trigger 83 is further rotated by the spring 85 in a clockwise direction to engage the pin 86, whereby the making lever 76 and the lever 88 are retained, and the closing torsion bars 29, 35 are maintained in a prestressing state.

Next, the operation of the making operation preventing deice 130 will be described. When a circuit opening instruction is generated, the coil 52T (20a) of the releasing electromagnet 20 is excited (FIG. 5), and the plunger 20b is driven rightward from the state of FIG. 12, whereby engagement with the first releasing latch 69 and the guide 62 by the releasing trigger 73 is released to thereby perform a circuit opening operation. As soon as the circuit of the breaker is opened, the normally open contact 52a of the auxiliary switch is opened, and excitation to the releasing coil 52T is stopped. The above-mentioned series of operations is the same as that in Embodiment 5 with respect to FIGS. 12 to 21.

In this case, since the coil 52R of the interlocking electromagnet 135 is excited, the plunger 135b is driven downward, and the trigger lever 16d is pulled downward by means of the link 136, whereby the trigger lever 16d becomes a state that it is rotated around the pin 16f against the action of the spring 17 by a predetermined angle in a clockwise direction to be bent with respect to the plunger 135b. Further, in the same manner as Embodiment 5 in FIGS. 12 to 21, a predetermined gap is formed between the stepped portion 16e and the making trigger 83 as shown in FIG. 23.

In a case that the circuit opening instruction is generated continuously after the circuit has been opened, the coil 52R of the interlocking electromagnet 135 is excited continuously, and the gap between the trigger lever 16d and the making trigger 83 is kept. Accordingly, even when the making electromagnet 16 is excited, and the plunger 16b is moved rightward, the making trigger 83 is never kicked. Further, even though the plunger 16b is moved rightward by a manual operation, the making trigger 83 is never kicked. Accordingly, there is no possibility that the engagement between the making trigger 83 and the making latch 79 is released to close the on-off contact 10 as long as the interlocking electromagnet 135 is excited.

EMBODIMENT 7

Figure 24:
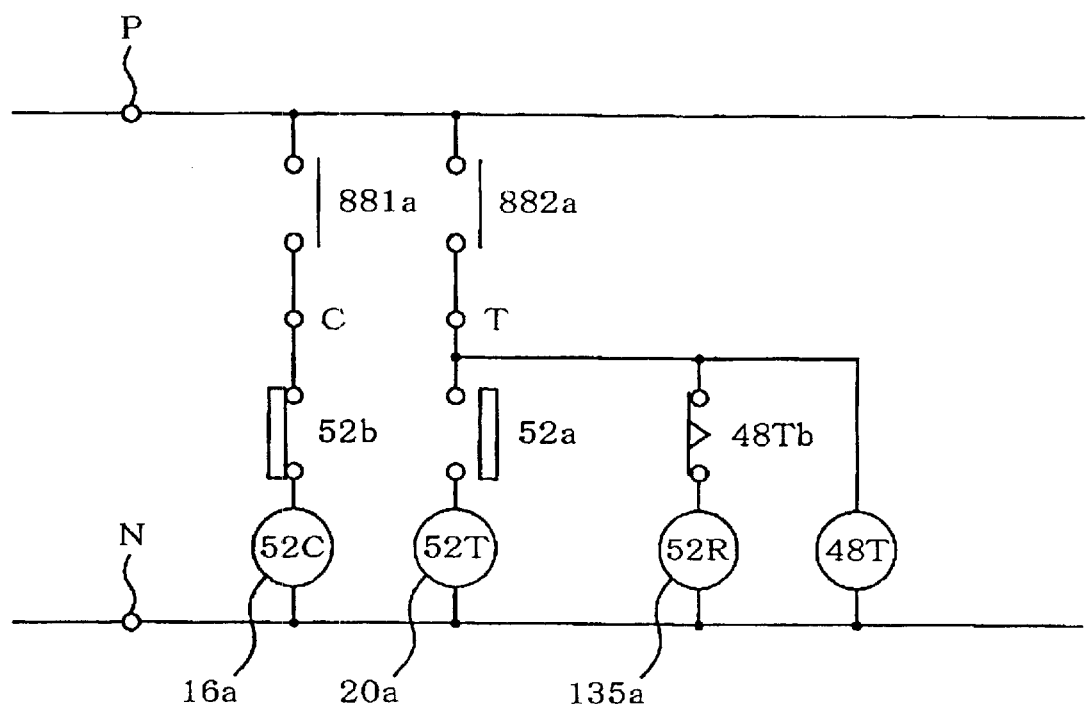
FIG. 24 is a sequence diagram of the control device for a breaker according to another embodiment of the present invention.

FIG. 24 is a sequential diagram of the control device for a breaker according to another embodiment of the present invention. In FIG. 24, numerical reference 48T represents a timer as an excitation breaking means, which is connected between a releasing terminal T and a negative terminal N. Further, the coil 52R (135a) of an interlocking electromagnet 135 is connected to the releasing terminal T through a normally close contact of time limit operation 48Tb of the timer 48T.

Operations will be described. In FIG. 24, when a circuit opening signal is generated, a normally open contact 882a of a releasing auxiliary relay is closed to excite the releasing coil 52T, whereby the on-off contact 10 is opened. At the same time, the timer 48T is excited. When the circuit opening instruction is continuously generated after the circuit has been opened, while the normally open contact 882a is kept closing, the normally close contact of time limit operation 48Tb is opened after a predetermined time has passed. When the normally close contact of time limit operation 48Tb is opened, excitation to the coil 135a of the interlocking electromagnet 135 is stopped.

Thus, since the excitation to the interlocking electromagnet 135 is stopped by the timer 48T after a predetermined time, the coil 135a of the interlocking electromagnet 135 can be of a rating of short time, and therefore, the size of the making operation preventing device 130 can be reduced.

The torsion bars as closing or opening prestressing means are not limited to the above-mentioned ones but may be coil springs or other elastic members such as air springs or rubber members, or may be a combination of a tank which stores compressed air and an air cylinder connected to the tank for example. Further, the make break switch may be an isolator, a load switch or the like as far as the same effect can be obtained.

The present invention provides the following advantages.

According to an aspect of the invention described in claim 1, the making operation preventing device prevents the releasing of the prestressing force of the prestressing means for closing circuit, which is caused by the retaining means for closing circuit, by a circuit opening instruction, whereby a needless circuit closing operation is prevented when the circuit opening instruction is generated. Accordingly, reliability on a state of opening the circuit is improved.

According to an aspect of the invention described in claim 2, the releasing member can not be driven by the plunger, whereby a needless circuit closing operation can be prevented when the circuit opening instruction is generated to thereby improve reliability on a state of opening the circuit.

According to an aspect of the invention described in claim 3, the rotatable member is bent to render the engagement with the releasing member to be impossible so that the driving of the releasing member by the rotatable member is prevented, whereby a needless circuit closing operation can be prevented when the circuit opening instruction is generated to thereby improve reliability on a state of opening the circuit.

According to an aspect of the invention described in claim 4, the driving of the releasing member is prevented by limiting the movement of the plunger, whereby a needless circuit closing operation can be prevented when the circuit opening instruction is generated to thereby improve reliability on a state of opening the circuit.

According to an aspect of the invention described in claim 5, the movement of the plunger is mechanically prevented by the movable member so that the driving of the releasing member is prevented, whereby a needless circuit closing operation can be prevented when the circuit opening instruction is generated to thereby improve reliability on a state of opening the circuit.

According to an aspect of the invention described in claim 6, an electromagnet force of the circuit closing electromagnet is canceled to prevent the movement of the plunger, whereby a needless circuit closing operation can be prevented when the circuit opening instruction is generated to thereby improve reliability on a state of opening the circuit.

According to an aspect of the invention described in claim 7, the movable member restricts the releasing member so as not to move, whereby a needless circuit closing operation can be prevented when the circuit opening instruction is generated to thereby improve reliability on a state of opening the circuit.

According to an aspect of the invention described in claim 8, excitation to the interlocking electromagnet or the interlocking coil is stopped when the circuit opening instruction is continued for a predetermined time.

Accordingly, the interlocking electromagnet or the interlocking coil can be of a rating of short time, and the making operation preventing device can be minimized.

Obviously, numerous modifications and variations of the present invention are possible in light of the above teachings. It is therefore to be understood that within the scope of the appended claims, the invention may be practiced otherwise than as specifically described herein.

The entire disclosure of Japanese Patent Application No. 2000-352028 filed on Nov. 20, 2000 including specification, claims, drawings and summary are incorporated herein by reference in its entirety.

What is claimed is:

1. A control device for a make break switch which comprises:

a prestressing means for opening circuit, connected to an on-off contact;

a retaining means for opening circuit, which retains a prestressing force of the prestressing means for opening circuit and which according to a circuit opening instruction, releases the prestressing force of the prestressing means for opening circuit to open the on-off contact by a releasing force of the prestressing means for opening circuit;

a retaining means for closing circuit, which retains a prestressing force of a prestressing means for closing circuit and which according to a circuit closing instruction, releases the prestressing force of the prestressing means for closing circuit to close the on-off contact by a releasing force of the prestressing means for closing circuit via the prestressing means for opening circuit; and a making operation preventing device actuated by an circuit opening instruction to prevent the releasing of the prestressing force of the prestressing means for closing circuit, which is caused by the retaining means for closing circuit.

2. The control device for a make break switch according to claim 1, wherein the retaining means for closing circuit comprises a circuit closing electromagnet having a plunger which is driven by an exciting coil and a releasing member driven by the plunger to release the prestressing force of the prestressing means for closing circuit, and the making operation preventing device is to prevent the releasing member from being driven by the plunger.

3. The control device for a make break switch according to claim 2, wherein in the retaining means for closing circuit, the plunger has a body portion and a rotatable member connected to the body portion so as to be capable of being bent by rotating itself in a direction perpendicular to the direction of moving the body portion, said retaining means for closing circuit being adapted to release the prestressing force of the prestressing means for closing circuit by driving the releasing means via the rotatable member, and the making operation preventing device has an interlocking electromagnet comprising an electromagnet and a movable member driven by the electromagnet, the making operation preventing device being so adapted that when the electromagnet is excited by a circuit opening instruction, the rotatable member is bent by the movable member to make the engagement with the releasing member impossible, whereby the driving of the releasing member by the rotatable member can be prevented.

4. The control device for a make break switch according to claim 3, wherein an excitation breaking means is provided to stop excitation to the interlocking electromagnet or the interlocking coil when the circuit opening instruction is continued for a predetermined time.

5. The control device for a make break switch according to claim 2, wherein the making operation preventing device prevents the plunger from moving.

6. The control device for a make break switch according to claim 5, wherein the making operation preventing device has an interlocking electromagnet comprising an electromagnet and a movable member driven by the electromagnet so that when the electromagnet is excited by a circuit opening instruction, the movement of the plunger is mechanically prevented by the movable member.

7. The control device for a make break switch according to claim 6, wherein an excitation breaking means is provided to stop excitation to the interlocking electromagnet or the interlocking coil when the circuit opening instruction is continued for a predetermined time.

8. The control device for a make break switch according to claim 5, wherein the making operation preventing device has an interlocking coil which is excited by a circuit opening instruction to cancel an electromagnetic force of the circuit closing electromagnet, whereby the movement of the plunger is prevented.

9. The control device for a make break switch according to claim 8, wherein an excitation breaking means is provided to stop excitation to the interlocking electromagnet or the interlocking coil when the circuit opening instruction is continued for a predetermined time.

10. The control device for a make break switch according to claim 2, wherein the making operation preventing device has an interlocking electromagnet comprising an electromagnet and a movable member driven by the electromagnet so that the electromagnet is excited by a circuit opening instruction and the movable member holds the releasing member so as not to move.

11. The control device for a make break switch according to claim 10, wherein an excitation breaking means is provided to stop excitation to the interlocking electromagnet or the interlocking coil when the circuit opening instruction is continued for a predetermined time.

* * * * *